US009096383B2

(12) United States Patent   (10) Patent No.: US 9,096,383 B2
Rhodes                      (45) Date of Patent:     Aug. 4, 2015

(54) SYSTEMS, METHODS, AND APPARATUS FOR IMPROVED CONVEYOR SYSTEM

(75) Inventor: Arthur Rhodes, Prospect, KY (US)

(73) Assignee: RSI, Inc., Louisville, KY (US)

(*) Notice: Subject to any disclaimer, the term of this patent is extended or adjusted under 35 U.S.C. 154(b) by 366 days.

(21) Appl. No.: 13/223,234

(22) Filed: Aug. 31, 2011

(65) Prior Publication Data

US 2013/0048472 A1    Feb. 28, 2013

(51) Int. Cl.
*B61B 1/00*   (2006.01)
*B61B 10/04*  (2006.01)
*B65G 23/44*  (2006.01)
*B65G 19/02*  (2006.01)
*B65G 35/06*  (2006.01)

(52) U.S. Cl.
CPC . *B65G 23/44* (2013.01); *B61B 1/00* (2013.01); *B61B 10/04* (2013.01); *B65G 19/02* (2013.01); *B65G 35/06* (2013.01)

(58) Field of Classification Search
CPC ...... B61B 10/10; B61B 10/04; B61B 10/043; B61B 10/046; E05D 11/02; B65G 21/22; B65G 19/02; B65G 35/06; B65G 23/44; B65G 17/02; B65G 23/06
USPC ............. 104/49, 48, 50, 75, 35, 172.1, 172.2, 104/172.3, 172.5
See application file for complete search history.

(56) References Cited

U.S. PATENT DOCUMENTS

| | | | | |
|---|---|---|---|---|
| 1,545,890 A * | 7/1925 | Fowler | ............................... | 410/1 |
| 1,741,842 A * | 12/1929 | Holtschmit | ................... | 198/329 |
| 4,470,355 A * | 9/1984 | Kunczynski | .................. | 104/196 |
| 4,944,228 A * | 7/1990 | Rhodes | ....................... | 104/172.3 |
| 5,299,680 A * | 4/1994 | Rhodes | ....................... | 198/465.2 |
| 5,443,014 A * | 8/1995 | Belanger et al. | ............ | 104/172.3 |
| 7,451,523 B2 * | 11/2008 | Chen | ............................... | 16/342 |

* cited by examiner

*Primary Examiner* — Mark Le
(74) *Attorney, Agent, or Firm* — Valenti, Hanley & Robinson, PLLC; Kevin T. Duncan

(57) ABSTRACT

Systems, methods, and apparatuses relating to improved conveying systems, and in particular to providing locomotion preferably using a surface mounted drive mechanism for driving a drive chain are provided. Generally, the conveying system of the present invention is designed to adapt to most manufacturing needs, for example, from furniture manufacturing and finishing to marine and automotive engines. In one embodiment, the present invention provides a conveying system, comprising: at least one load carrying unit having a tow pin assembly, the tow pin assembly further comprising a tow pin configured to link to and delink from a conveyor tow chain, and the tow pin configured to engage and disengage from the conveyor tow chain; a conveyor track configured to house the conveyor tow chain; and a drive assembly configured to receive the tow chain and to provide locomotion to the conveyor tow chain, and further comprising at least one tensioner for tensioning the conveyor tow chain.

16 Claims, 31 Drawing Sheets

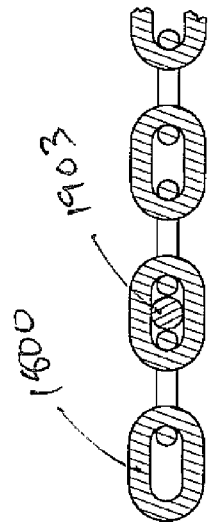
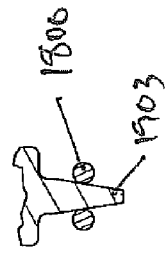
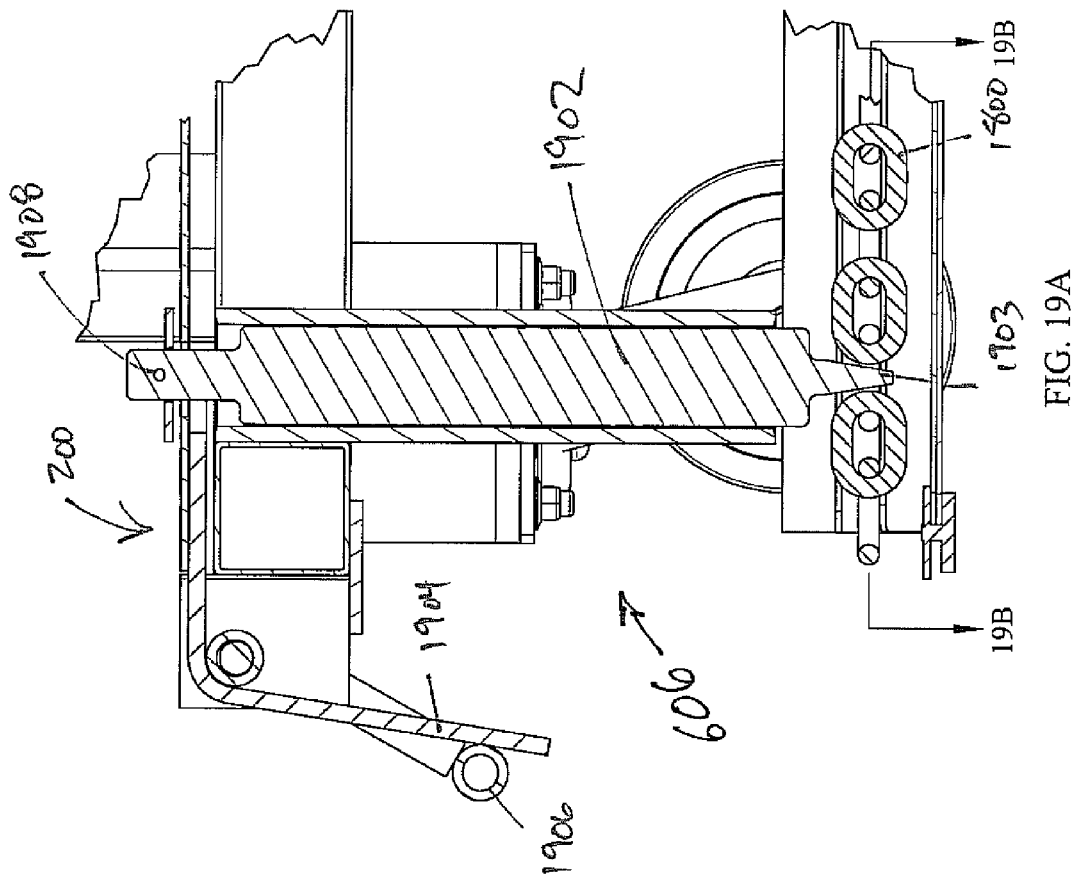
FIG. 19B
FIG. 19C
FIG. 19A

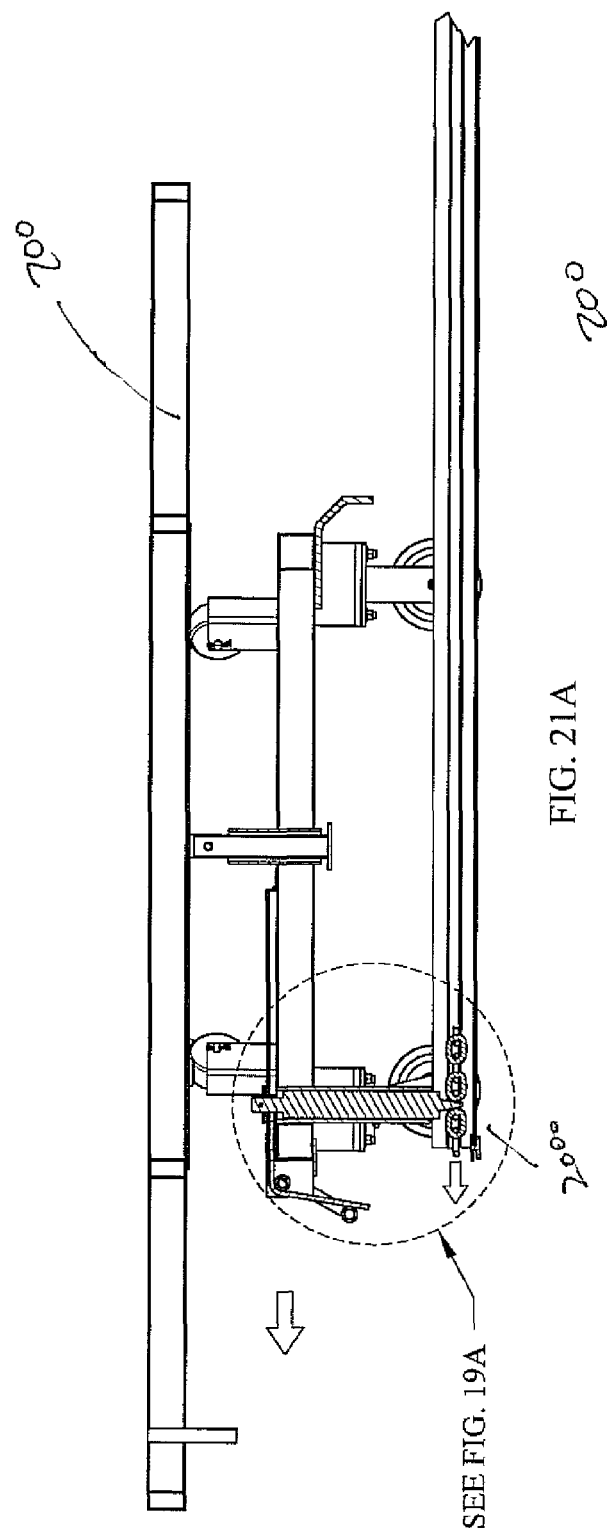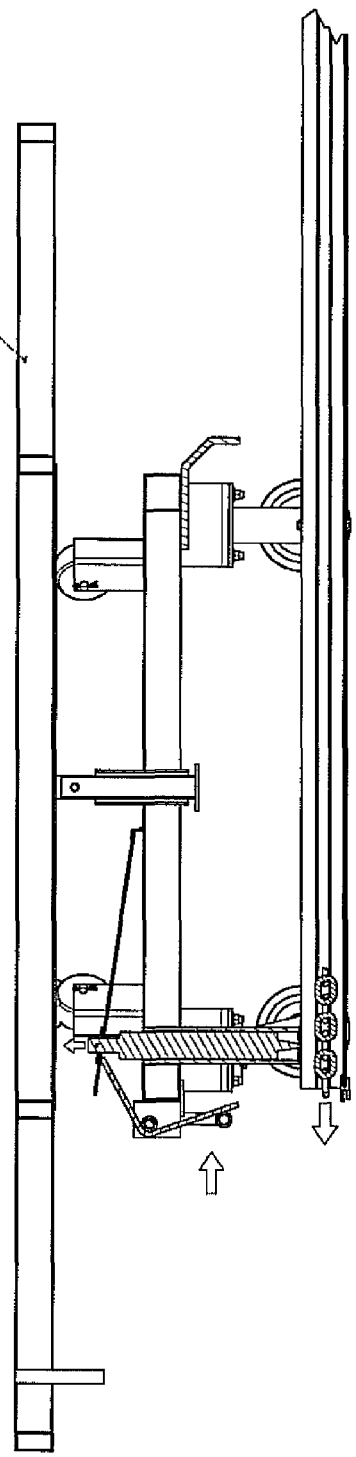
FIG. 21A
FIG. 21B

SYSTEMS, METHODS, AND APPARATUS FOR IMPROVED CONVEYOR SYSTEM

FIELD OF THE INVENTION

The invention relates generally to conveying systems, and various related components, for moving work pieces from work station to work station including conveyors which generally move at a constant speed and include load carrying units which can be coupled for movement therewith between work stations and uncoupled from the conveyor so that they will be stationary at the work stations while work is done on a work piece carried by the load carrying units. More particularly, the present invention pertains to improved systems, methods, and apparatuses for providing locomotion and control to a conveyor system.

BACKGROUND OF THE INVENTION

In the manufacturing industry today, many manufacturers utilize conveyor systems for easily and quickly moving products through various stages of the manufacturing process. For example, in the furniture industry, a piece of furniture may be placed on a conveyor cart connected to a conveyor system which passes through sanding stations, paint booths, finishing stations, hardware stations, etc. Existing conveyor systems typically consist of a series of conveyor carts upon which various items may be placed, a drive chain housing secured to the floor of the manufacturing facility through which a drive chain passes which pulls the conveyor carts, and a drive mechanism for providing locomotion to the chain and thereby moving the conveyor carts.

Examples of known conveying systems are set forth in a number of U.S. patents including U.S. Pat. Nos. 4,438,702; 4,638,740; 4,644,869; 4,770,285; 4,944,228; 4,947,978; 5,065,678; 5,299,680; 5,368,152; 5,538,126; 5,549,050, which Applicant hereby incorporates by reference in their entirety. In these conveyor systems, the load carrying units are provided with vertically movable pins for engaging and disengaging with movable endless chains which move at a constant and continuous speed. Many different means have been used for moving these vertical pins from an engaging to a disengaging position and problems have been encountered in maintaining these pins in a disengaged position as the endless chain continues to move beneath the pins. U.S. Pat. Nos. 4,944,228; 5,368,152; 5,538,126; and 5,549,050, which Applicant hereby incorporates by reference in their entirety, teach various means for stabilizing the engaging pins in a disengaged position.

Other embodiments of these conveying systems include overhead conveyers for propelling a carrier moveably along a track by an endless conveyor chain disposed within the track. The carrier is detachably connected to the chain and includes an uncoupling assembly for detaching the carrier from the chain. U.S. Pat. Nos. 6,378,440; 6,827,200; and 6,843,358, which Applicant hereby incorporates by reference in their entirety, relate to various overhead conveyers.

In typical conveying system configurations, the drive mechanism of current conveyor systems must be placed below the level of the drive chain (i.e., below the surface of the floor). To do this, a large cavity must be created in the manufacturing room floor directly adjacent to and beneath the drive chain housing and drive chain. This cavity houses the drive mechanism. Such a configuration is required in current conveyor systems because as the system operates, the drive chain wears and settles, thus creating excess chain or "slack" in the drive chain. By placing the drive mechanism below the drive chain housing (i.e., below the surface of the floor), excess chain may be collected in the cavity. Normally, the excess chain has a tendency to bind up and become tangled; however, allowing the chain to collect in the cavity allows gravity to act on the excess chain and provide the tension necessary to prevent the excess chain from binding up or tangling. That is, the excess chain exiting the drive mechanism simply hangs freely until pulled up into the drive chain housing.

One problem with mounting the drive mechanism below the drive chain housing in a large floor cavity is that creating the sub-surface cavity is difficult, fixed and expensive. The cavity may be several feet across in width and may extend several feet into the floor beneath the drive chain housing. As most manufacturing facility floors are made of concrete or other similar material, creating such a large cavity in this type of material is both laborious and expensive. Further, the placement of the cavity may be dictated by the specific design of the manufacturing facility floor. For instance, sub-surface pipes, electrical wiring, or other objects may prevent the cavity from being located in certain otherwise desirable locations. As a result, a manufacturing line may need to be redesigned or otherwise modified to account for the placement of the drive mechanism and its cavity, adding yet additional costs and delaying installation of the conveyor system.

What is needed is a solution to address the various problems associated with current conveyor systems, including the sub-surface drive mechanism of current conveyor systems.

SUMMARY OF THE INVENTION

The present invention provides systems, methods, and apparatuses relating to improved conveying systems, and in particular to providing locomotion preferrably using a surface mounted drive mechanism for driving a drive chain. Generally, the conveying system of the present invention is designed to adapt to most manufacturing needs, for example, from furniture manufacturing and finishing to marine and automotive engines. The versatility of the conveying system of the present invention is achieved by the use of a special tow or "log" chain which allows the carts to be placed on practically any center distance you choose. This combined with adjustable speed ranging from a generous FPM range allow for the right amount of time for each operation to be completed properly, and not the hurry-up, here-comes-the-next-part method that can cause costly mistakes and poor overall quality. These features are incorporated with cart delays which can be placed in work stations, spray booths, drying ovens or practically anywhere on the system as required by particular needs.

The cart as shown in FIG. 2 includes wheels or casters on which is supported a frame, typically rotatable about an axis such as for accumulation or "close-pack" as described elsewhere. On the frame of the cart, a platform rests on which articles, such as fixtures and products (e.g., furniture to be treated or painted in a finishing process), are supported for transport via the conveying system to various stations or locations along a fabrication or manufacturing process. A towline conveyor propels the cart along the conveyor line or circuit from station to station. The log chain is made from a calibrated, close tolerance design to mate with a pin or "tow pin" that extends, typically downwardly, from the cart. The cart includes a tow pin assembly that supports and guides the pin during operation.

Various configurations of tow pins may be used with the tow pin assembly connected to the cart and the log chain of the conveyor system. The log chain links or loops are designed to match the dimensions of the tow pin engagement head so as to promote disengagement and to prevent the tow pin from becoming "stuck" in the log chain link, which causes undesired effects along the conveyor system.

Additional embodiments of the present invention may include a pusher station, an anti-backup component that provides a means to prevent roll-back of a cart during conveyor operation, an accumulator or close-pack configuration, a pin turner station to more effectively make the cart platform swivel or rotate about an axis (e.g., 90 degrees) to achieve a desired placement or positioning of the product begin carried on the cart for finishing, and an above-ground drive assembly for providing locomotion to the conveying system, among other components as described herein.

In a first embodiment, the present invention provides a conveying system, comprising: at least one load carrying unit having a tow pin assembly, the tow pin assembly further comprising a tow pin configured to link to and de-link from a conveyor tow chain, and a means for engaging and disengaging the tow pin; a conveyor track configured to house the conveyor tow chain; and a drive assembly configured to receive the tow chain and to provide locomotion to the conveyor tow chain, and further comprising at least one tensioning means for tensioning the conveyor tow chain.

In addition, the first embodiment of the present invention may further include the following features. The tensioning means comprises at least one spring. An accumulation assembly for accumulating a plurality of load carrying units, the accumulation assembly having a first stopping arm adapted to engage the tow pin assembly for causing a load carrying unit to stop at a defined location. A second stopping arm adapted to engage the tow pin assembly for causing a second load carrying unit to stop at a second defined location. The tow pin further comprises a series of indentation rings about the circumferential surface, the indentation rings being configured to facilitate the application of a lubricant. A turning assembly for rotating an upper portion of the at least one load carrying unit, the turning assembly further comprising: a pin turning assembly configured to receive a turning pin on the portion of the at least one load carrying unit and further comprising a pin turning track for guiding the turning pin; a plurality of wheels configured to stabilize a lower portion of the at least one load carrying unit; and at least one tensioning wheel configured to provide a tensioning force against the lower portion of the at least one load carrying unit, wherein the at least one tensioning wheel is positioned on an opposite side of the lower portion of the at least one load carrying unit as the plurality of wheels. A transfer station.

In a second embodiment, the present invention provides a drive assembly for providing locomotion to a conveyor tow chain, comprising: a drive motor configured to turn a drive gear, the drive gear being configured to receive a conveyor tow chain; and a spring having a first end and a second end, the first end being connected to the drive motor and the second end being connected to a mount surface, wherein the spring applies a force between the drive motor and the mount surface to provide tension to the conveyor tow chain. In addition, the second embodiment of the present invention may further include the following features. A second spring having a first end and a second end, the first end being connected to the drive motor and the second end being connected to the mount surface.

BRIEF DESCRIPTION OF DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 18A depicts a section of tow chain while

FIGS. 19A-19C depict various views of a pin assembly and a tow chain.

FIGS. 21A and 21B depict a cart with a tow pin assembly both linked (21A) and delinked (21B) from a tow chain.

DETAILED DESCRIPTION OF PREFERRED EMBODIMENT

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
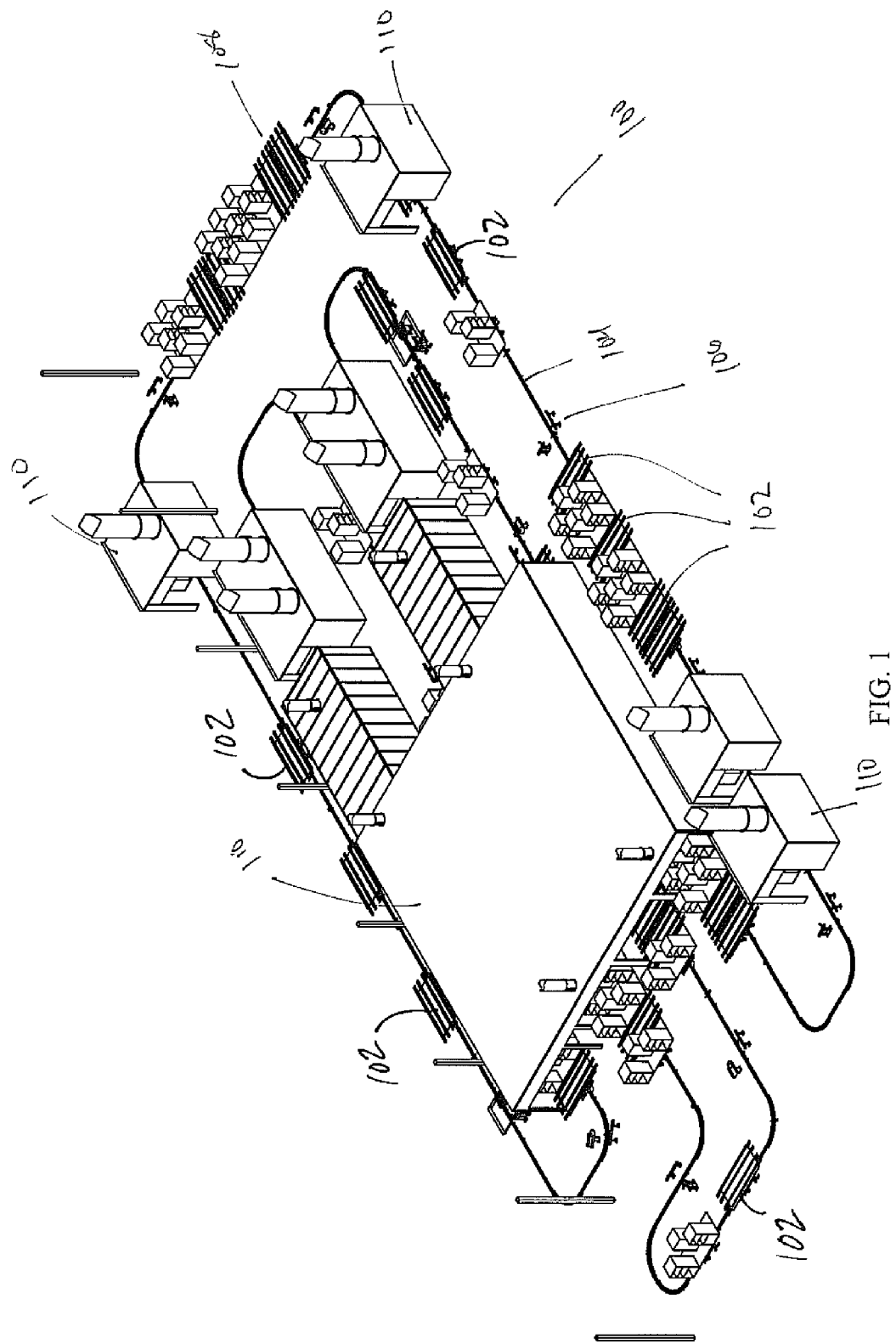
FIG. 1 is a diagram depicting the conveying system in a manufacturing facility.

FIG. 1 depicts an exemplary embodiment of the entire conveying system 100 including manufacturing components 110 as the system would be used in a manufacturing environment. As shown in FIG. 1, carts 102 are moved from one manufacturing station (e.g. a sanding station) to another manufacturing station (e.g. a finishing station) along one or more tracks 104, which includes a drive chain. The drive chain, discussed more thoroughly below, resides within track 104 and engages a pin on carts 102 to couple with and cause carts 102 to move about the conveying system. Various other components of the conveying system can be seen in FIG. 1 as well, which are described in more detail below. For instance, the exemplary configuration of the conveying system of the present invention includes pin-turner 106 and accumulator station 108.

Figure 2:
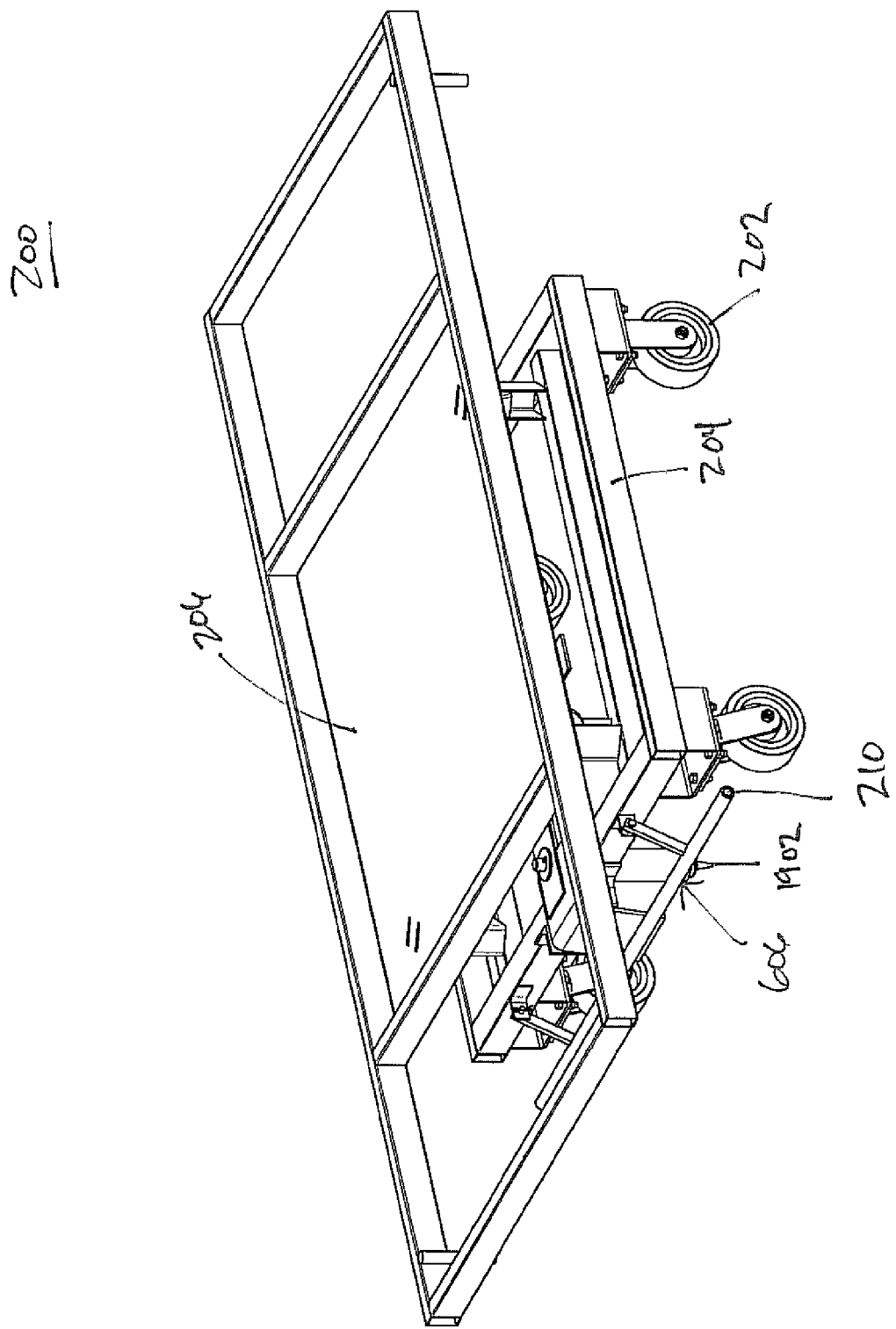
FIGS. 2-5 depict a cart used with the conveying system.
Figure 3:
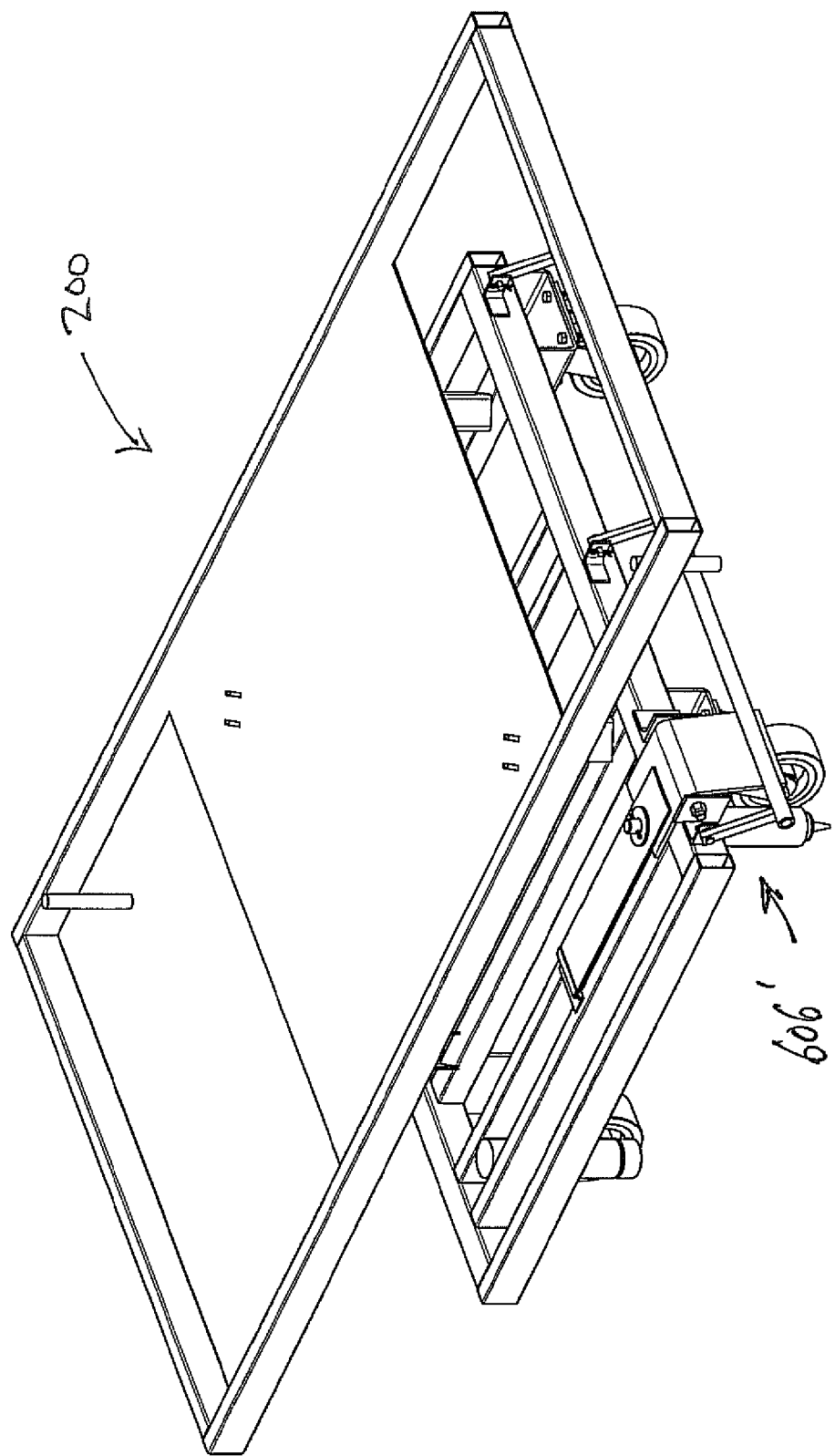
Figure 4:
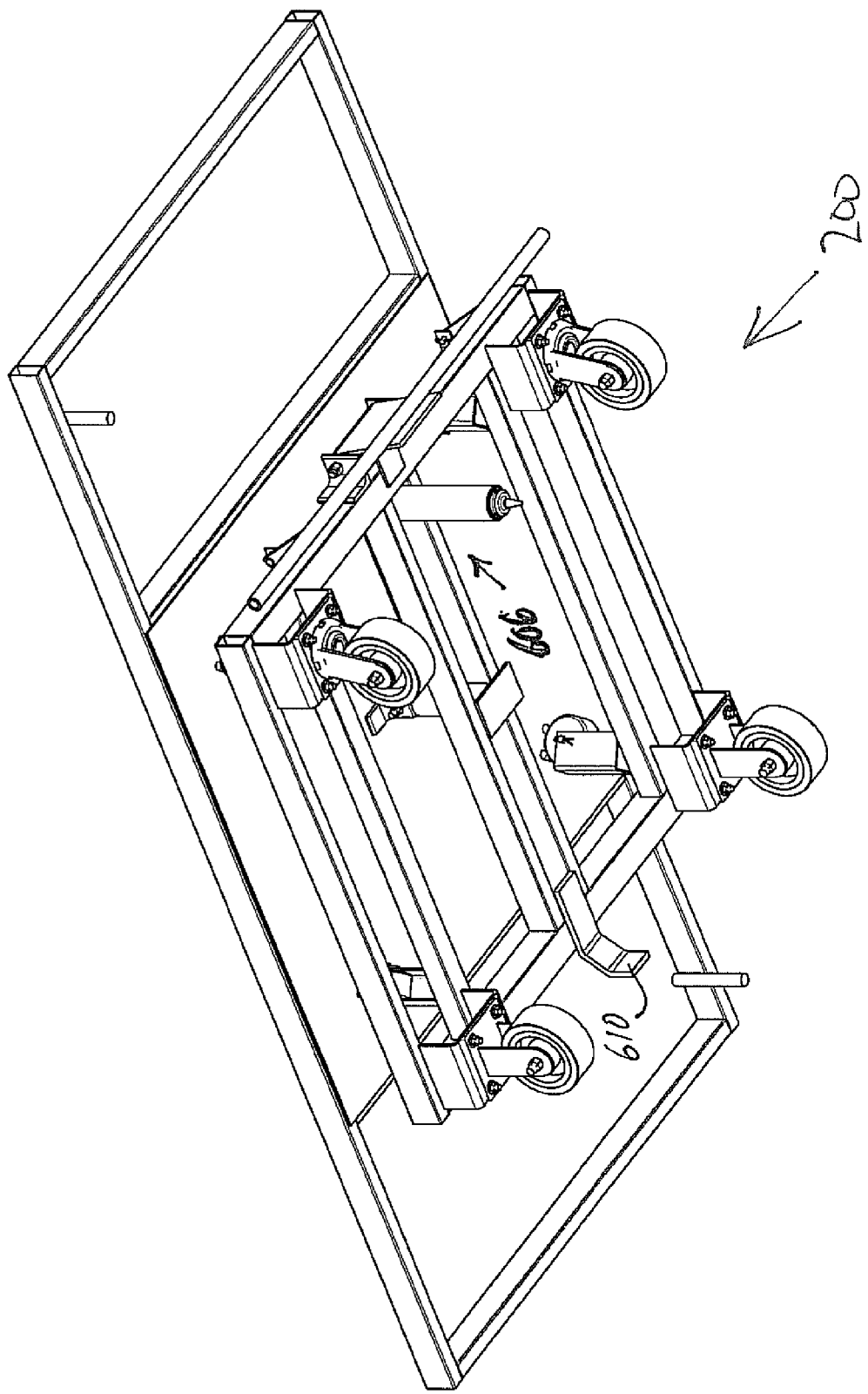
Figure 5:
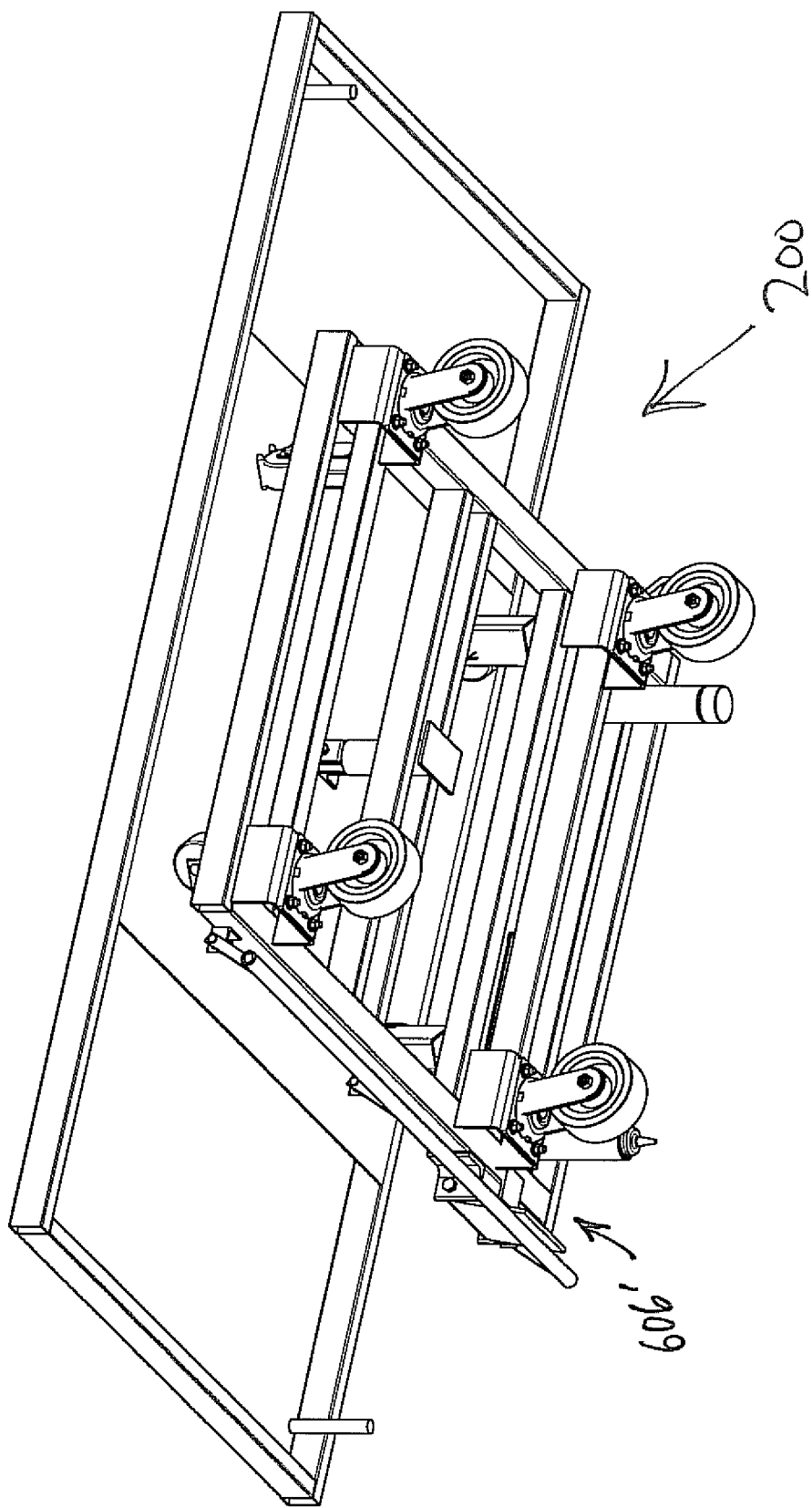

FIGS. 2-5 show an exemplary embodiment of a cart 200 used with the conveying system of the present invention. The cart as shown in FIGS. 2-5 include wheels or casters 202 connected to the body or carriage 204 of cart 200. Connected to the body 204 of cart 200 is a platform 206, which is typically rotatable about an axis such as for accumulation or "close pack" as described below. Tow pin assembly 606 includes tow pin 1902 and is described in more detail below (FIGS. 19A-19C). FIGS. 2 and 4 show cart 200 having a center tow pin assembly and FIGS. 3 and 5 show cart 200 having a "side" tow pin assembly 600. and The platform 206 rests on the body 204 of cart 200 upon which articles such as fixtures and products (e.g., furniture to be treated or painted in a finishing process) are supported for transport via the conveyor system 100 to various stations or locations along a fabrication or manufacturing process.

In order to be moved from station to station, the conveying system 100 as shown in FIG. 1 propels the cart 200 along the conveyor line or circuit from station to station by using a drive or tow chain 1800 (described elsewhere herein). The drive or tow chain 1800 is configured to receive a tow pin 208 of tow-pin assembly 606.

Delay Station and Accumulator

Figure 6:
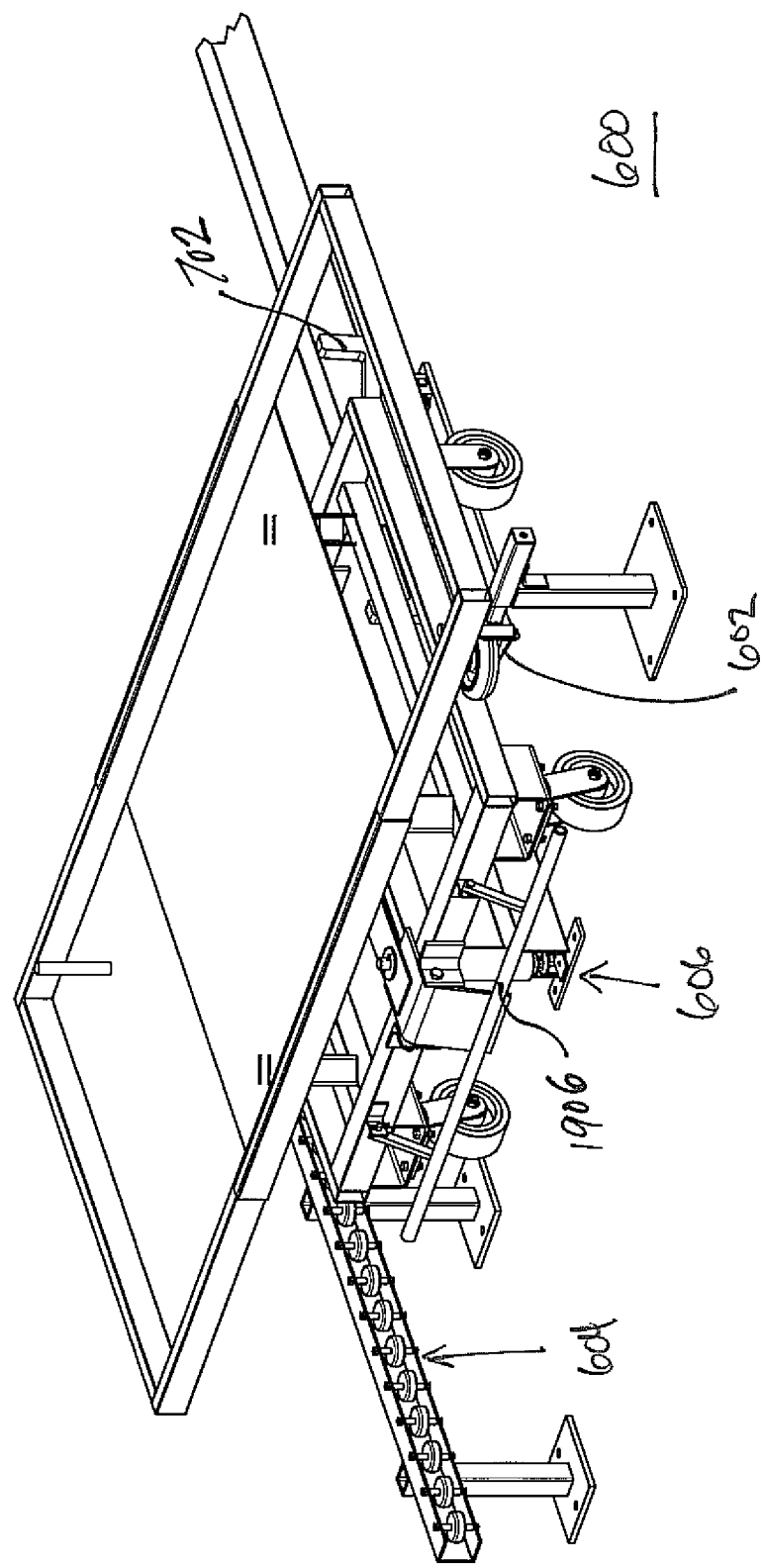
FIGS. 6-7 depict a cart in an accumulation/delay station.
Figure 10:
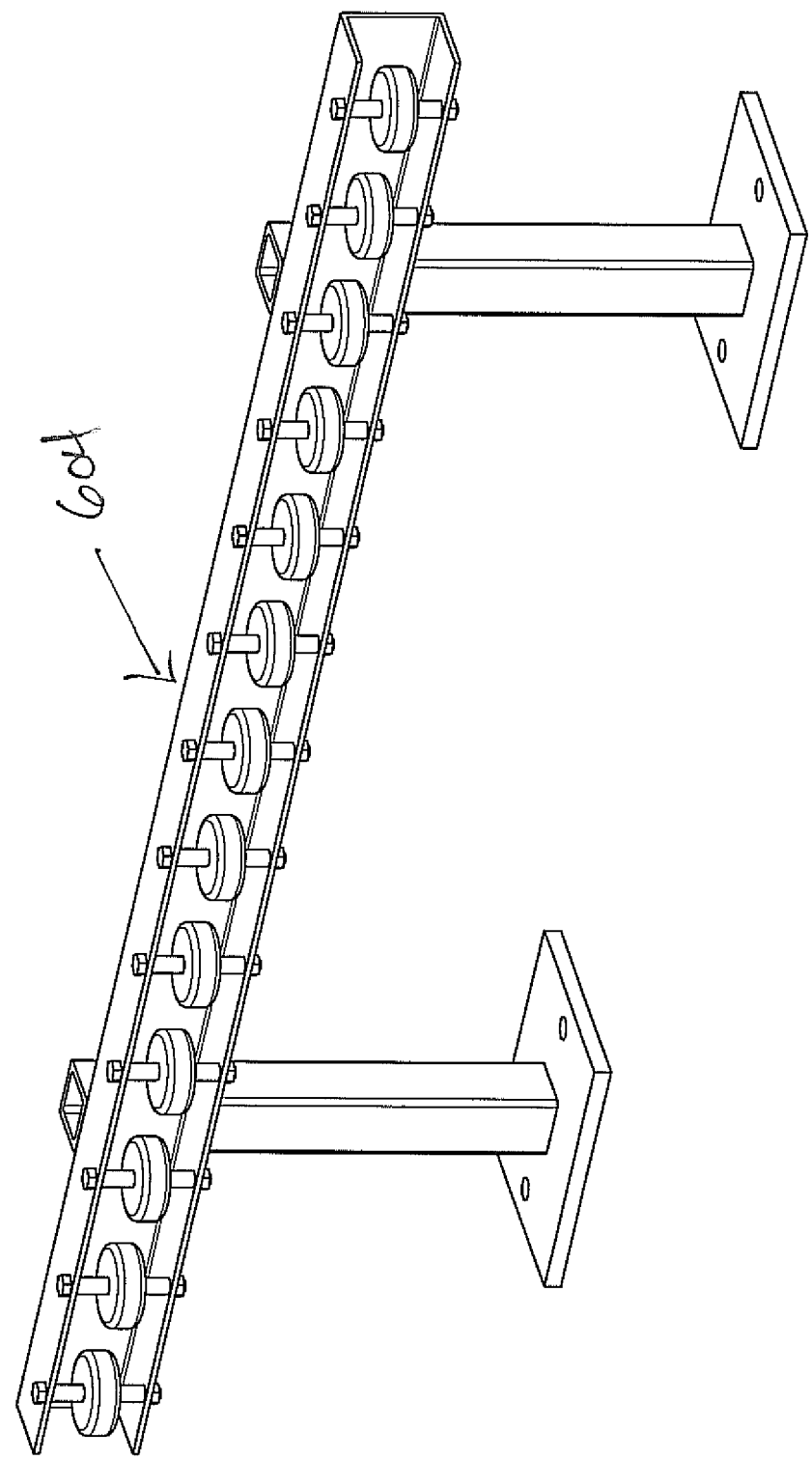
FIG. 10 depicts a guide wheel assembly.
Figure 26:
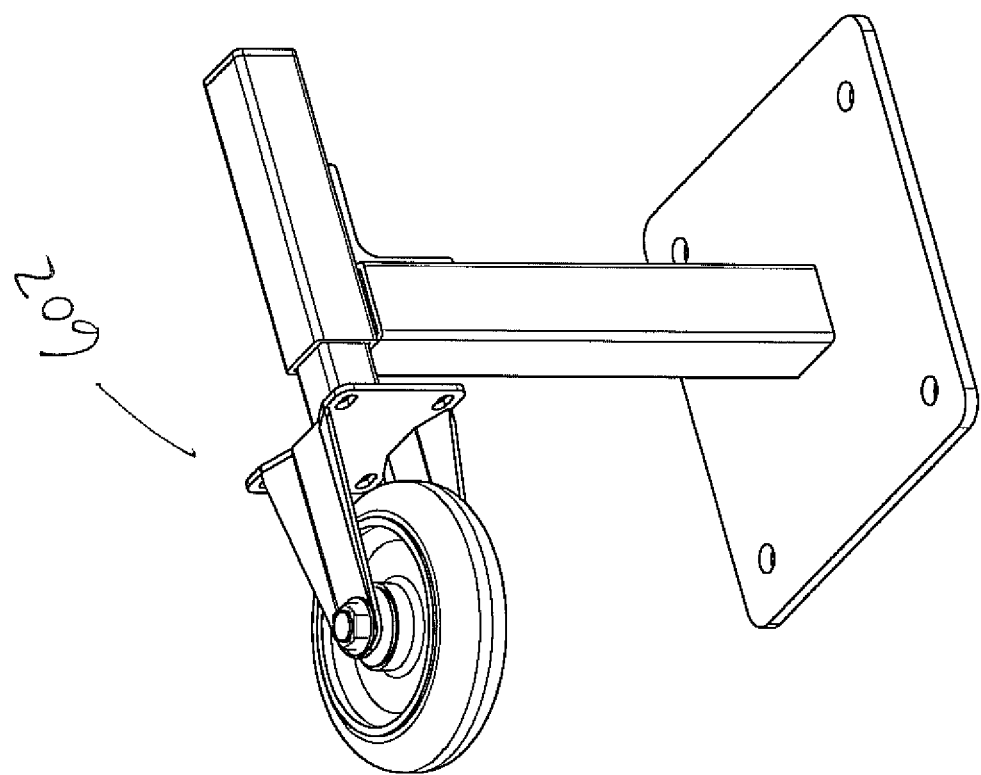
FIG. 26 depicts a spring-loaded tensioning wheel.

The delay station 600 shown in FIG. 6 allows controlled and variable motion by disengaging the cart pin from the chain. In this way, a cart may be delayed at a certain point along the conveying system 100 within the manufacturing process. The composition of delay station 600 may vary depending on the specific need and specifications of the conveying system 100, but in a preferred embodiment, delay station 600 consists of a single-arm stop (not shown) or a double-arm stop 702 (used for accumulation or close-pack configurations, described below), a tensioning wheel 602, and a set of static wheels 604 (as shown in FIG. 10). The single-arm stop (or double-arm stop) is hydraulically or electrically actuated to engage the tow-pin assembly 606, whereby causing the tow-pin to disengage from the tow chain. When the tow-pin disengages from the tow chain, the cart stops moving about the conveying system. The tensioning wheel 602 (also shown in FIG. 26) is spring loaded or otherwise moveably tensionable to apply tension against the cart, forcing the cart against static wheels 604, thereby preventing the cart from reversing or backing up after it disengages from the tow chain. The delay station 600 may additionally include a combination of the following components (not pictured): four-way air valve; air limit valves; vibration plates; and pitch plates.

Figure 7:
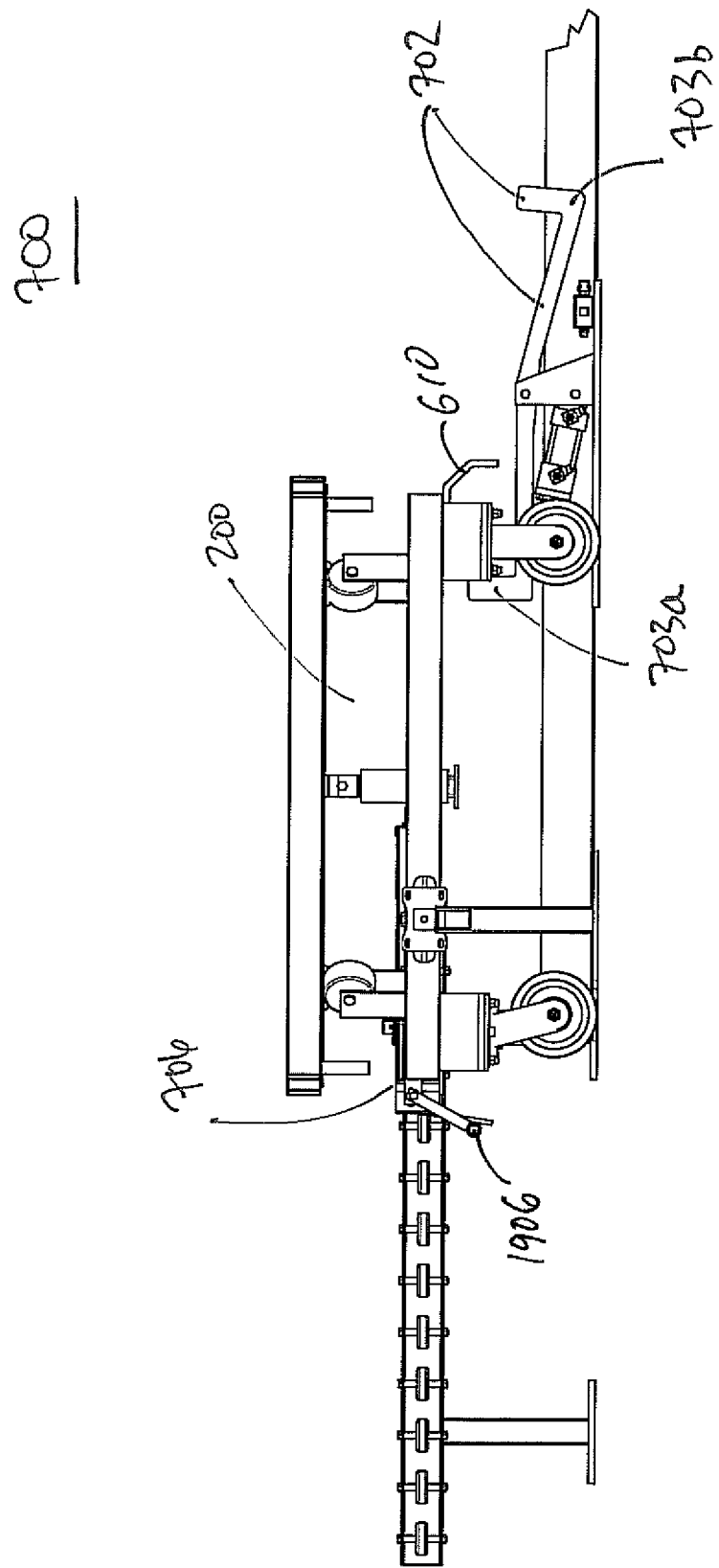
Figure 8:
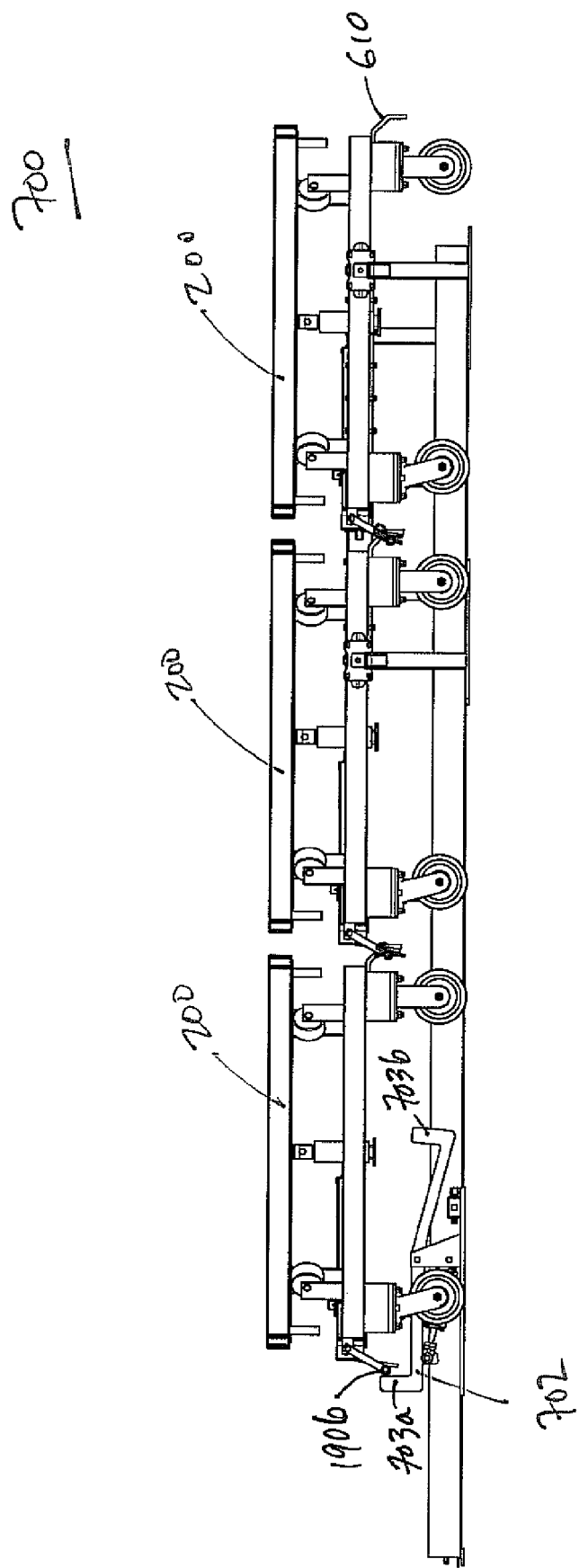
FIG. 8 depicts multiple carts collected at an accumulation station.
Figure 16:
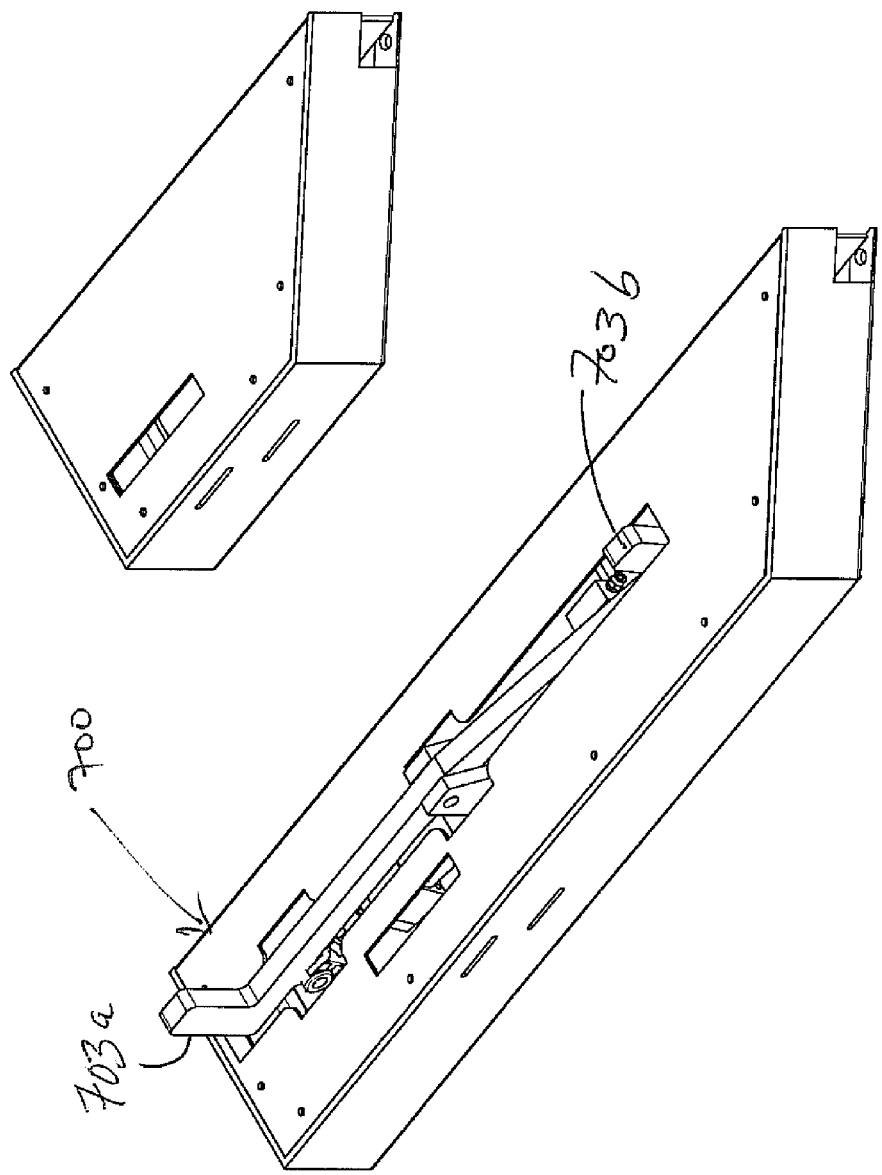
FIG. 16 depicts a double stack (or accumulation) assembly.

In the double-arm stop configuration 700 shown in FIGS. 7 and 8, a double-arm 702 (as shown in FIG. 8) engages bumper arm 1906 to cause tow pin 1902 to lift and disengage from tow chain and to stop one or multiple carts at one location, for example, in what is known as an accumulation or "close-pack" configuration. Known as an "accumulator" this double-arm stop configuration 700 is useful to allow a plurality of carts to come together in a smaller amount of space. This has the desired effect of allowing the finishing room or area within the manufacturing space to take up a smaller footprint. The double-arm 702 consists of a rocker arm with two stopping arms 703a and 703b. As in the single-arm stop configuration, the double-arm stop configuration 700 is hydraulically or electrically actuated to engage the tow-pin assembly 606, thereby causing the tow-pin 1902 to disengage from the tow chain. When the tow-pin 1902 disengages from the tow chain, the cart stops moving about the conveying system. FIG. 16 shows another view of double-arm stop 700 configured to be mounted to a manufacturing facility floor adjacent to the tow chain.

As shown in FIG. 8, stop arm 703a engages and deflects bumper bar 1906 to cause the tow pin to lift and disengage the tow chain and stop first cart 200. The back or rear bumper guard 610 engages the bumper bar of the second-in-line cart 200 to cause that cart's tow pin to disengage from the tow chain and stop the second-in-line cart. The bumper guard 610 of the second cart engages the bumper bar 1906 of the third cart, and so on.

Track, Drive Chain and Tow Pin

Figure 9:
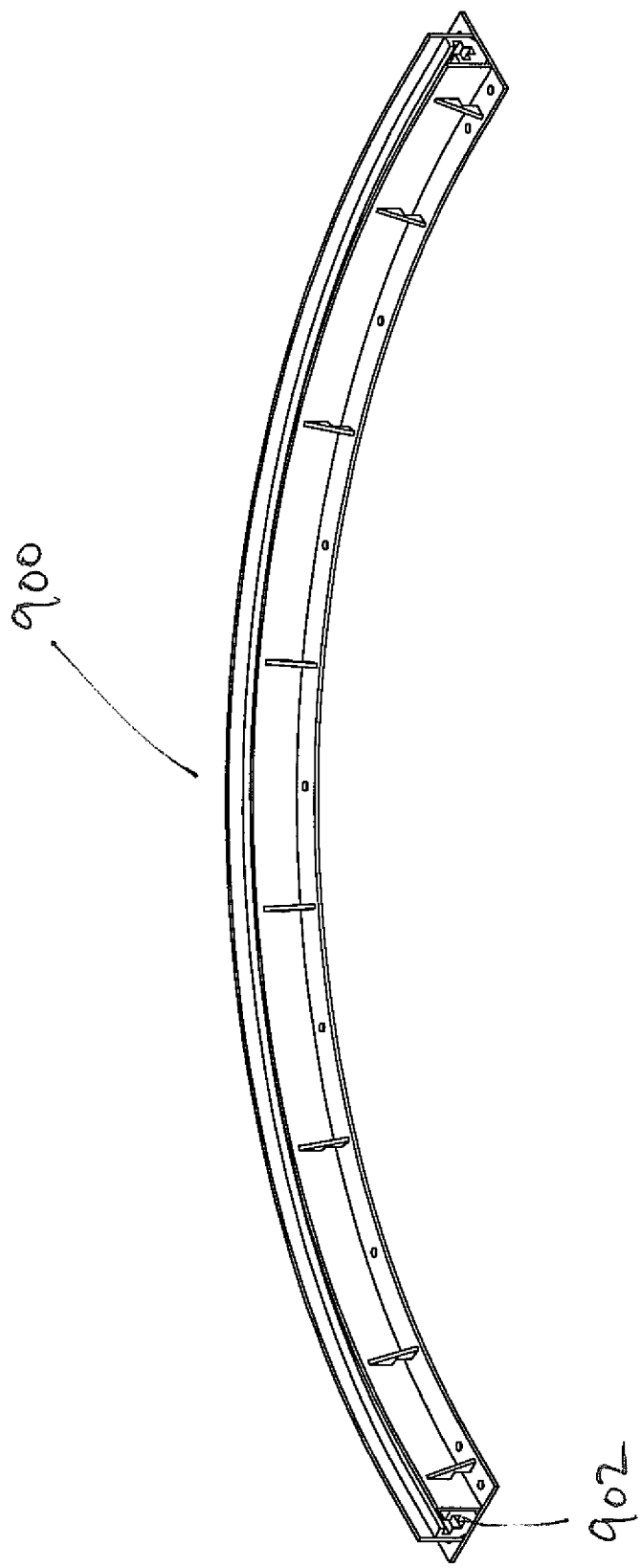
FIG. 9 depicts an arcuate section of track configured to receive a drive chain and for use with UHMW guide section.
Figure 11:
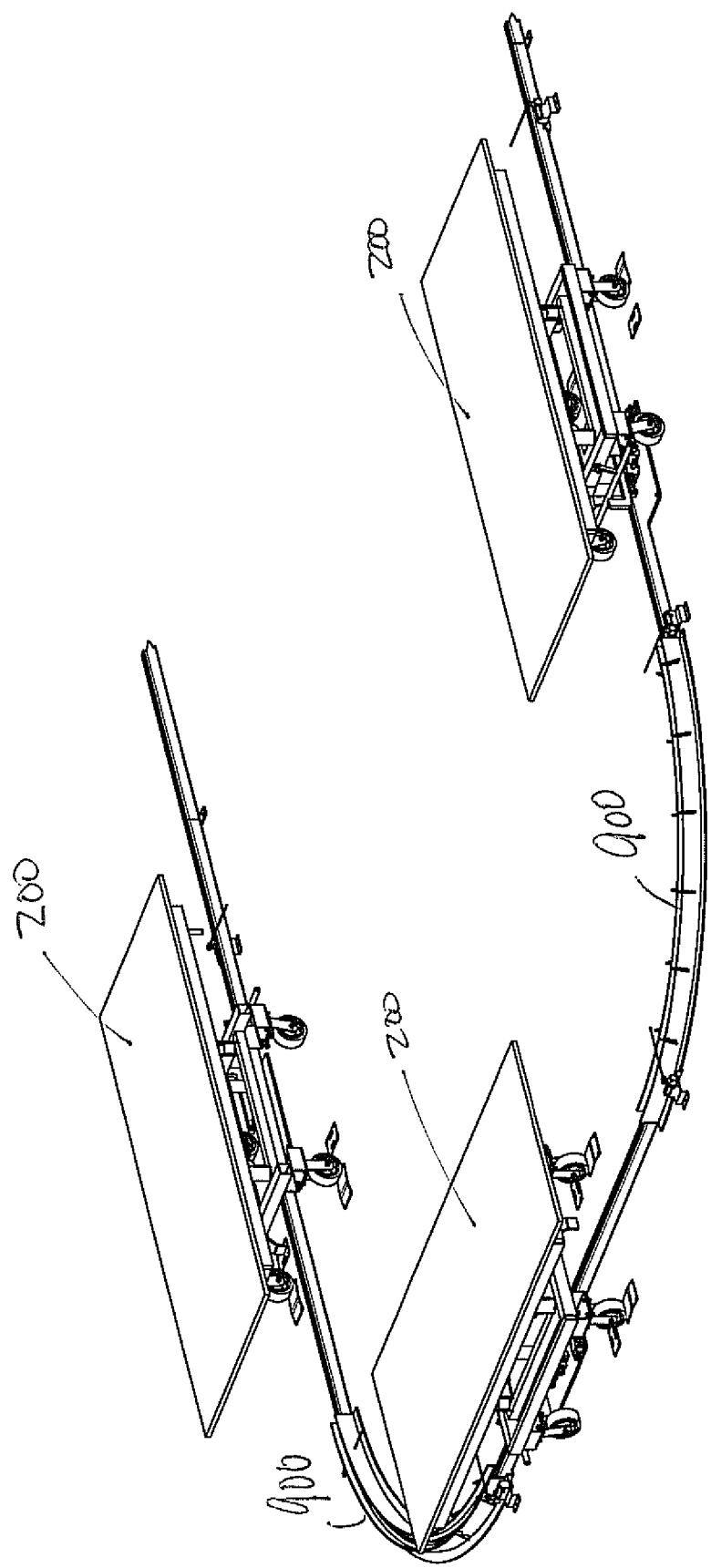
FIG. 11 depicts multiple carts at stations along a track of the conveying system.
Figure 12:
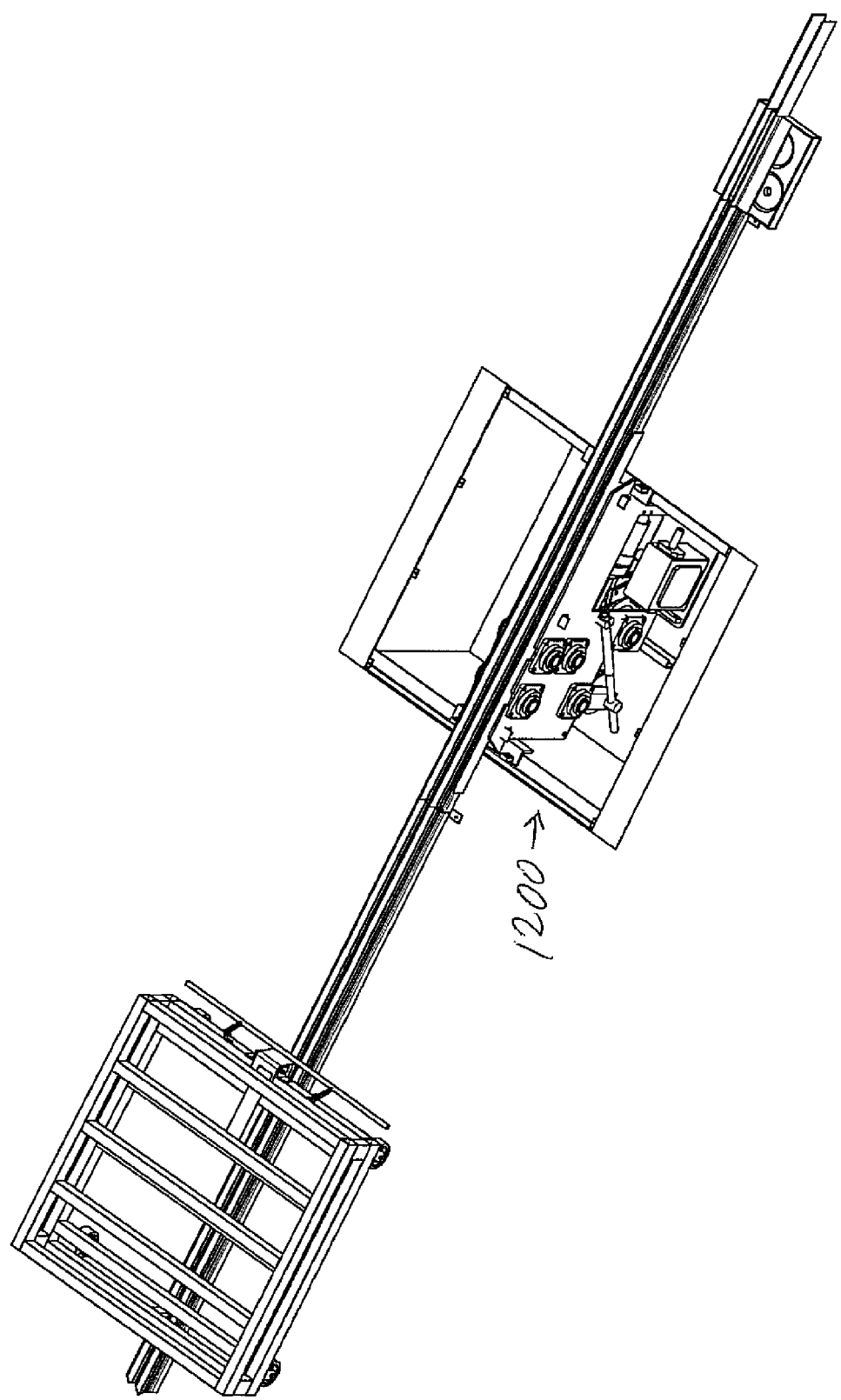
FIG. 12 depicts a cart on a track and an in-ground drive assembly.

FIG. 9 depicts an exemplary embodiment of an arcuate section of drive track 900. Drive track 900 houses the tow chain (not pictured) in channel 902. Channel 902 is composed from an ultra-high-molecular-weight polyethylene (UHMW) material which facilitates ease of passage of the tow chain through channel 902 and further facilitates "lubrication" of the tow chain. FIG. 11 shows two sections of arcuate chain guides 900 disposed in a u-shaped section of a conveying system.

Figure 17C:
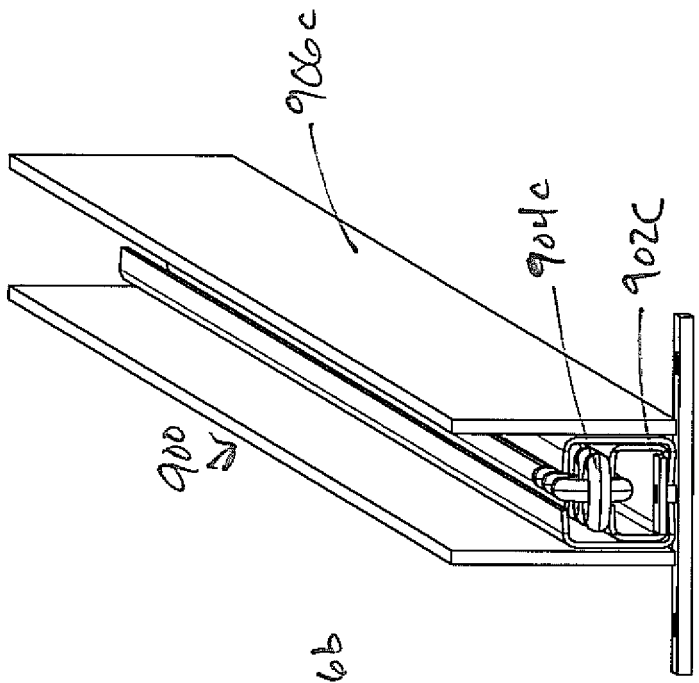
FIGS. 17A-17C depict various cross sections of tow chain, track, and UHMW.
Figure 17B:
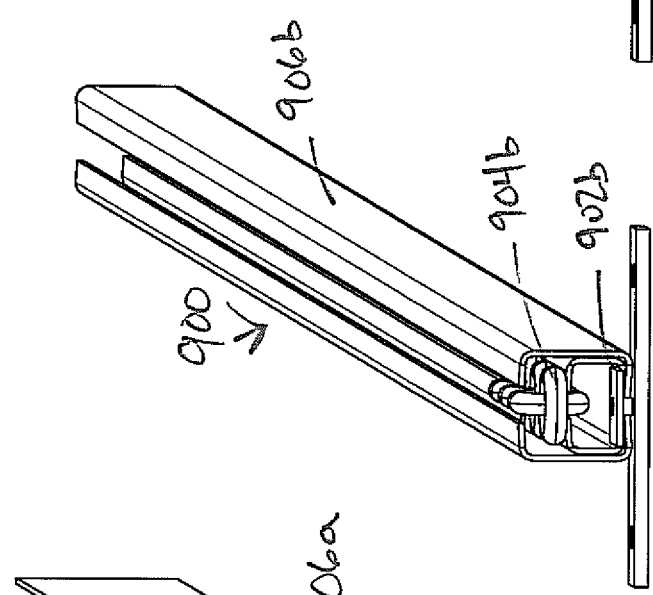
Figure 17A:
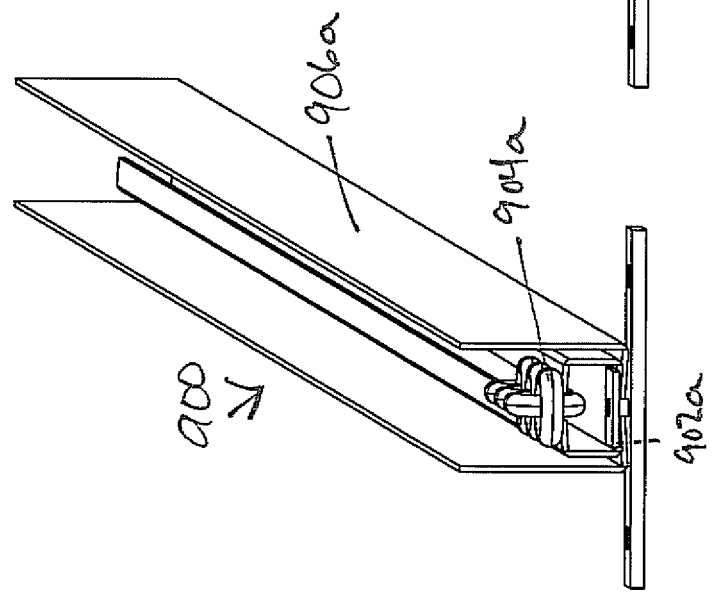

FIGS. 17A-17C show various cross sections of drive track 900. In FIG. 17A, drive track 900 contains channel 902a composed from UHMW material and drive chain 904a which passes through the opening in channel 902a. FIGS. 17B and 17C have similar arrangements but differ in the outside walls 906 which encompass the channel 902 and drive chain 904.

Figure 18B:
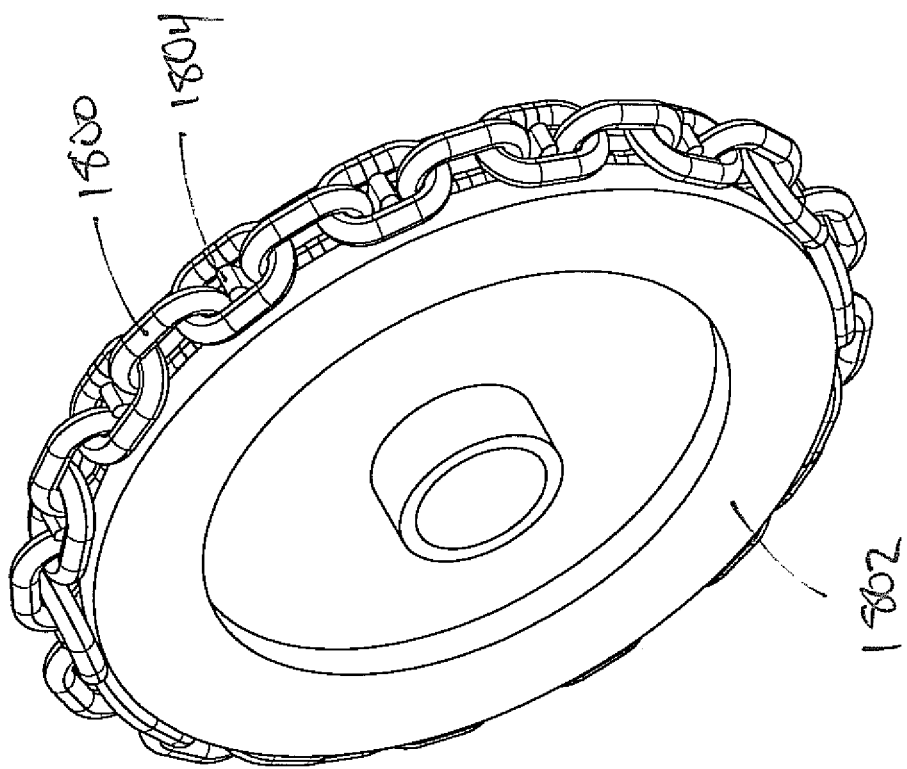
FIG. 18B depicts a section of tow chain in conjunction with a drive wheel.
Figure 18A:
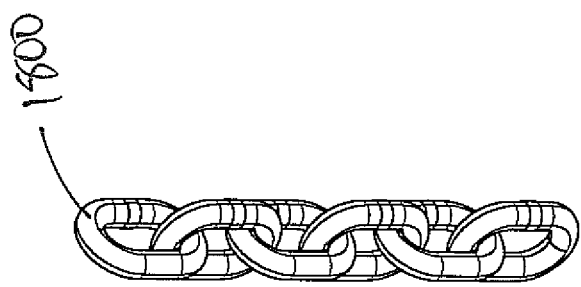
Figure 20:
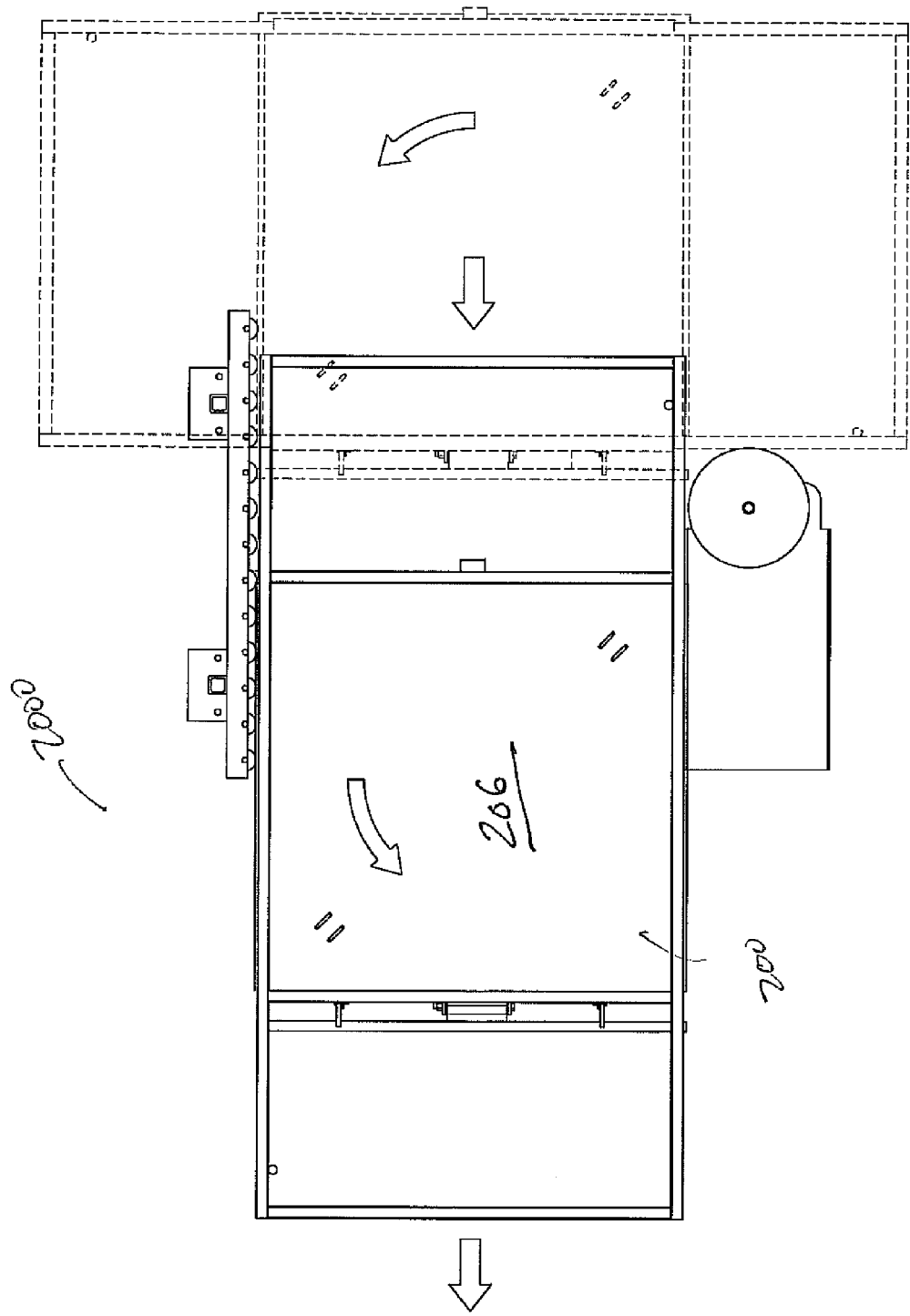
FIG. 20 depicts a cart and pin turning station.

FIG. 18A shows the drive chain 1800 consisting of metal links configured to pass through drive track such as drive track 900 shown in FIGS. 9 and 17A-17C. FIG. 18B shows drive chain 1800 positioned about a gear 1802 configured to receive drive chain 1804. The teeth 1804 of gear 1802 are configured to be positioned between links of drive chain 1800 such that when gear 1802 rotates it causes the drive chain 1800 to move.

FIG. 19A shows the tow-pin assembly 606 of cart 200 as it interacts with tow chain 1800. Tow-pin assembly 606 comprises tow pin 1902 which is effectively raised and lowered into position by operation of a bumper bar 1906, which when deflected or engaged depresses lift bar 1904 whereby causing tow-pin 1902 to lift. Tow-pin 1902 is rotatably connected to lift bar 1904 at pivot point 1908 in such a manner that when lift bar 1904 causes tow-pin 1902 to lift, tow-pin 1902 moves perpendicularly with relation to tow chain 1800, not with respect to lift bar 1904 (i.e., the angle between lift bar 1904 and tow pin 1902 changes as tow pin 1902 raises and lowers). Tow pin point 1903 is configured such that it fits between the links of tow chain 1800 without moving laterally, but also is configured in such a way that it cannot become stuck between the chain links. FIG. 19B is a top/bottom diagram of the tow chain 1800 receiving tow pin 1902 at tow pin point 1903. Specifically, tow pin point 1903 is shown being received by tow chain 1800. Likewise, FIG. 19C shows a side illustration of tow chain 1800 receiving tow pin point 1903 with part of the chain link removed for illustrative purposes. Tow pin point 1903 fits snugly between the edges of the chain link of tow chain 1800. FIG. 21A shows cart 200 having tow pin assembly 606 with tow pin 1902 as it engages tow chain 1800. Oppositely, FIG. 21B shows cart 200 having tow pin assembly 606 with tow pin 1902 which is disengaged from tow chain 1800. In this latter configuration of FIG. 21B, the cart would be stationary, while in FIG. 21A with tow pin 1802 engaged, the cart would be in motion in conveying system 101.

Figure 22B:
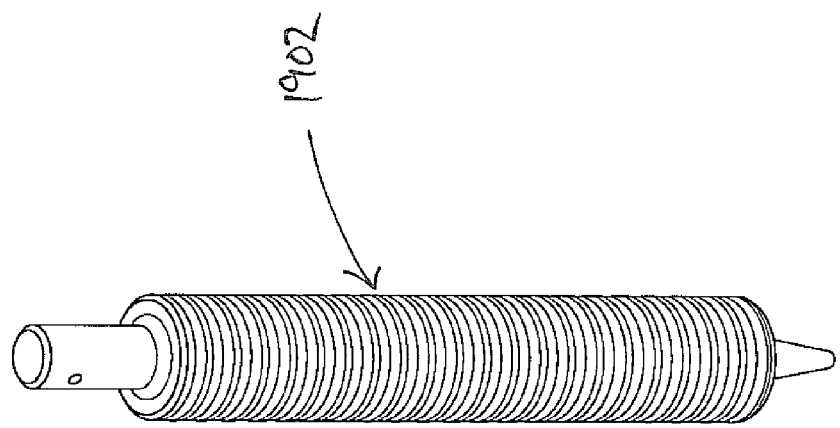
FIGS. 22A and 22B depict various views of an exemplary tow pin.
Figure 22A:
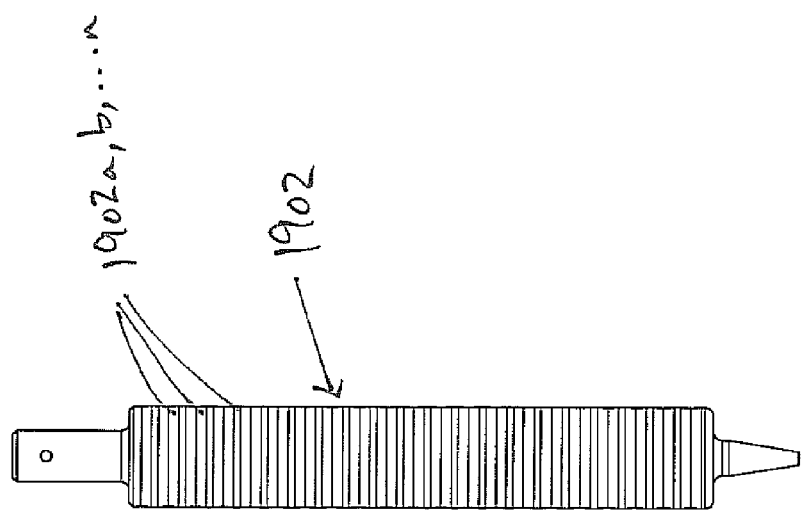

FIG. 22A and FIG. 22B both illustrate an exemplary embodiment of tow pin 1902. As shown in these figures, tow pin 1902 may have ridges 1902a, 1902b, . . . 1902n which facilitates lubrication. That is, when lubricants are applied to tow pin 1902, ridges 1902*a*, 1902*b*, . . . 1902*n* help maintain and apply the lubricant while tow pin 1902 moves vertically within tow pin assembly 606.

Pin Pusher

In an exemplary embodiment of the conveyor system 100 of the present invention as shown in FIGS. 12-15, there are stations, such as at drive assembly 1200, where pick-up of the tow chain results in a de-linking and re-linking operation over a limited span of space. This re-linking occurs by operation of a "pin pusher" 1300 which is designed to uniquely, effectively and efficiently provide de-linking (or unlinking) and re-linking of the tow pin, and thereby the cart associated with the tow pin, from and to the conveyor system 100. Upon de-linking, the cart is freed from following engagement of the tow chain. The pin pusher provides an element that in one embodiment is cylinder or piston driven so as to drivingly contact an element, such as an arm or angle iron or bracket of the cart to "push" it along over the span of log chain disengagement to the point of re-engagement or re-linking. The pusher may be pneumatically, hydraulically or electro-mechanically powered. Pusher should be adjusted so that a cart transfers over the dead space in the drive at the same speed as the tow chain is running.

Figure 13:
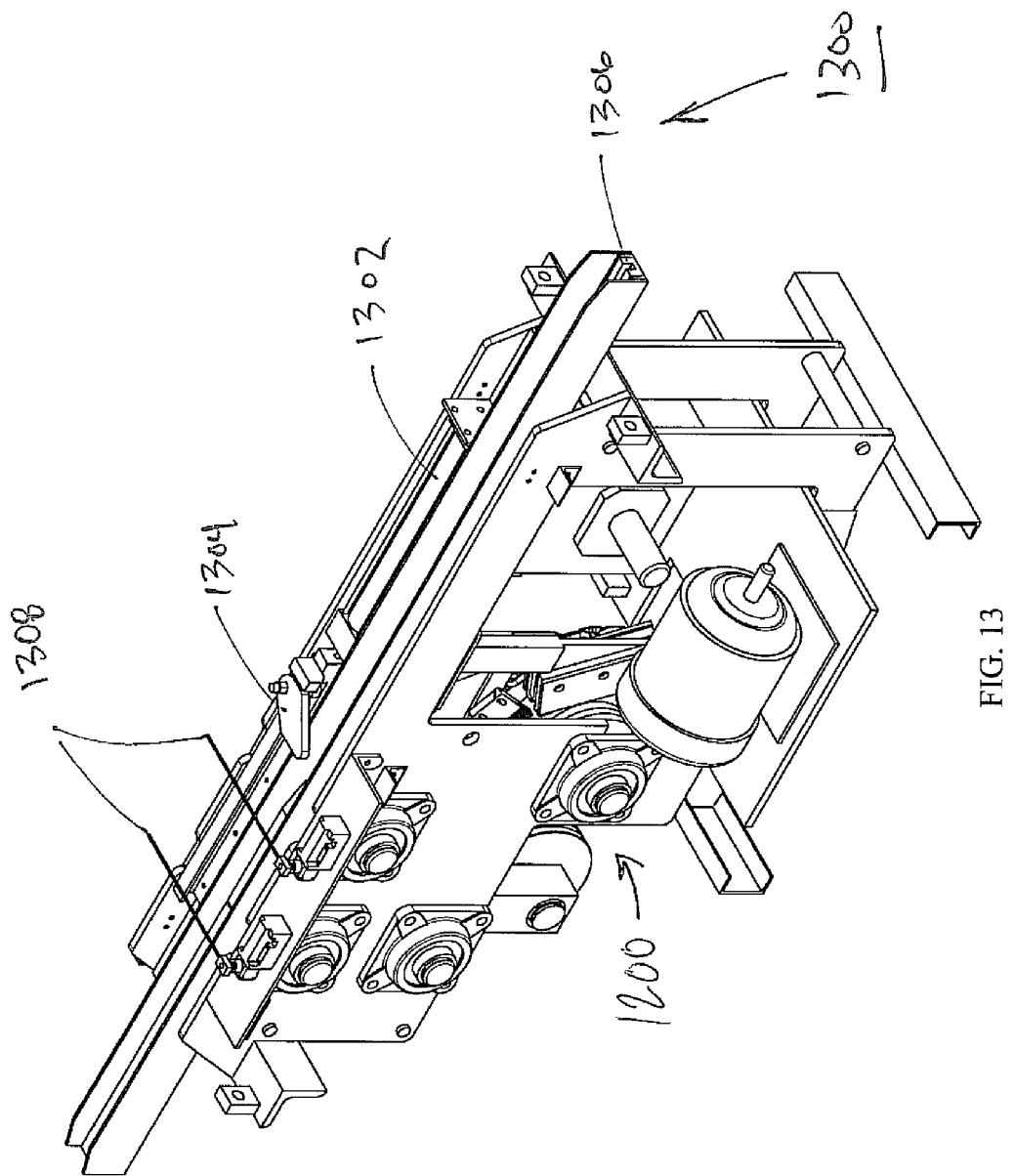
FIGS. 13-15 depict an in-ground drive assembly.
Figure 14:
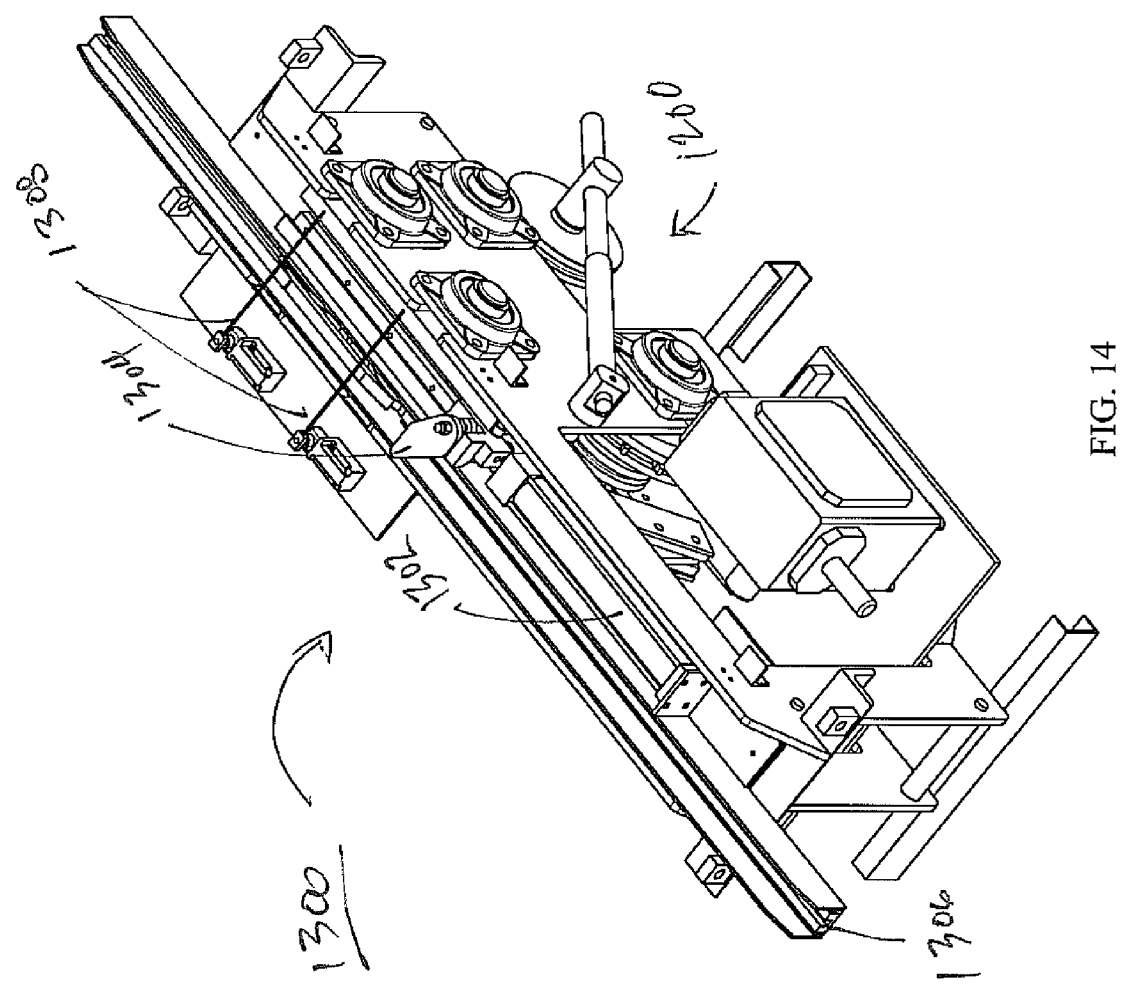
Figure 15:
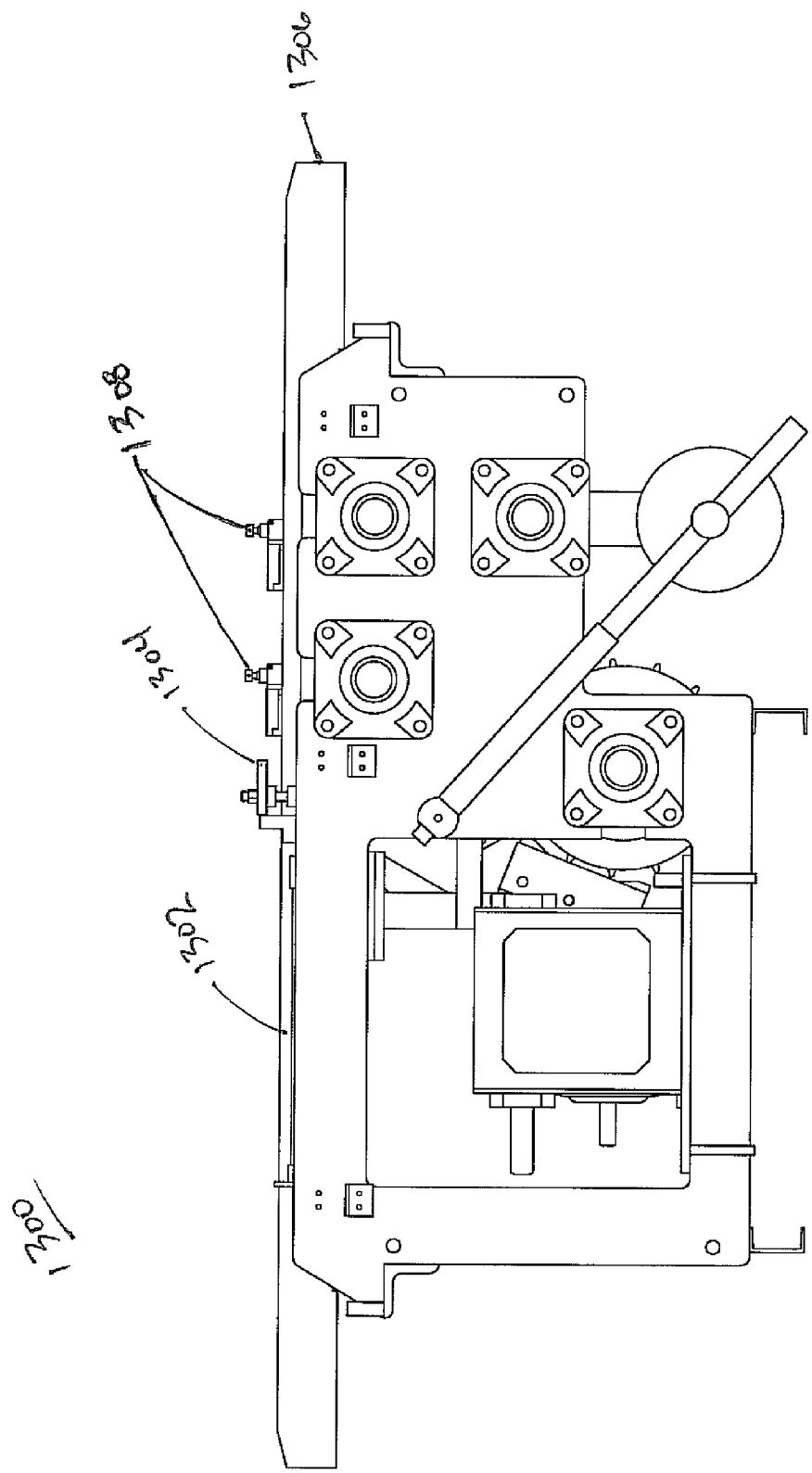

FIGS. 13-15 show an exemplary pin pusher 1300. Pin pusher 1300 consists of a pneumatic, hydraulic or electro-mechanical piston 1302 which provides mechanical power to the pin pusher. When piston 1302 is engaged, it applies force to pin engaging element 1304, which physically pushes the tow-pin 208 of the cart 200 shown in FIG. 2 forward after the tow-pin 208 de-links (or unlinks) from the tow chain, which runs through channel 1306. That is, as the tow chain moves along channel 1306, pulling the cart 200 along the conveying system 100, the tow chain de-links (or unlinks) from tow-pin 208 of cart 200. Upon de-linking (or unlinking), the piston 1302 engages and pushes the pin engaging element 1304 against tow-pin 208 causing cart 200 to continue moving forward. This de-linking (or unlinking) operation allows the tow chain to leave the track (e.g., channel 1306) and run through the drive motor, which provides locomotion to the conveying system 100. Once the tow chain passes through the drive motor, the tow chain re-enters the track (e.g., channel 1306) and the tow pin re-links with the tow chain.

In certain embodiments, pin pusher 1300 may further include electronic limit switches 1308 which are triggered upon the passage of the tow pin. For instance, when piston 1302 causes pin engaging element 1304 to push the tow pin (and therefore the cart) forward, the tow pin triggers electronic sensors 1308 which trigger pin pusher 1300 to start and stop. A variety of sensors and/or switches may be employed to sense de-linking (or location of cart/tow pin) and to engage the pin pusher to move into an engaging and pushing "operation" and to re-set upon completion.

Although FIGS. 12-15 illustrate the pin pusher feature in a below-surface drive assembly arrangement, it is equally useful in an above-surface drive assembly such as assembly 2900 of FIGS. 29-31.

Pin Turner

Figure 23:
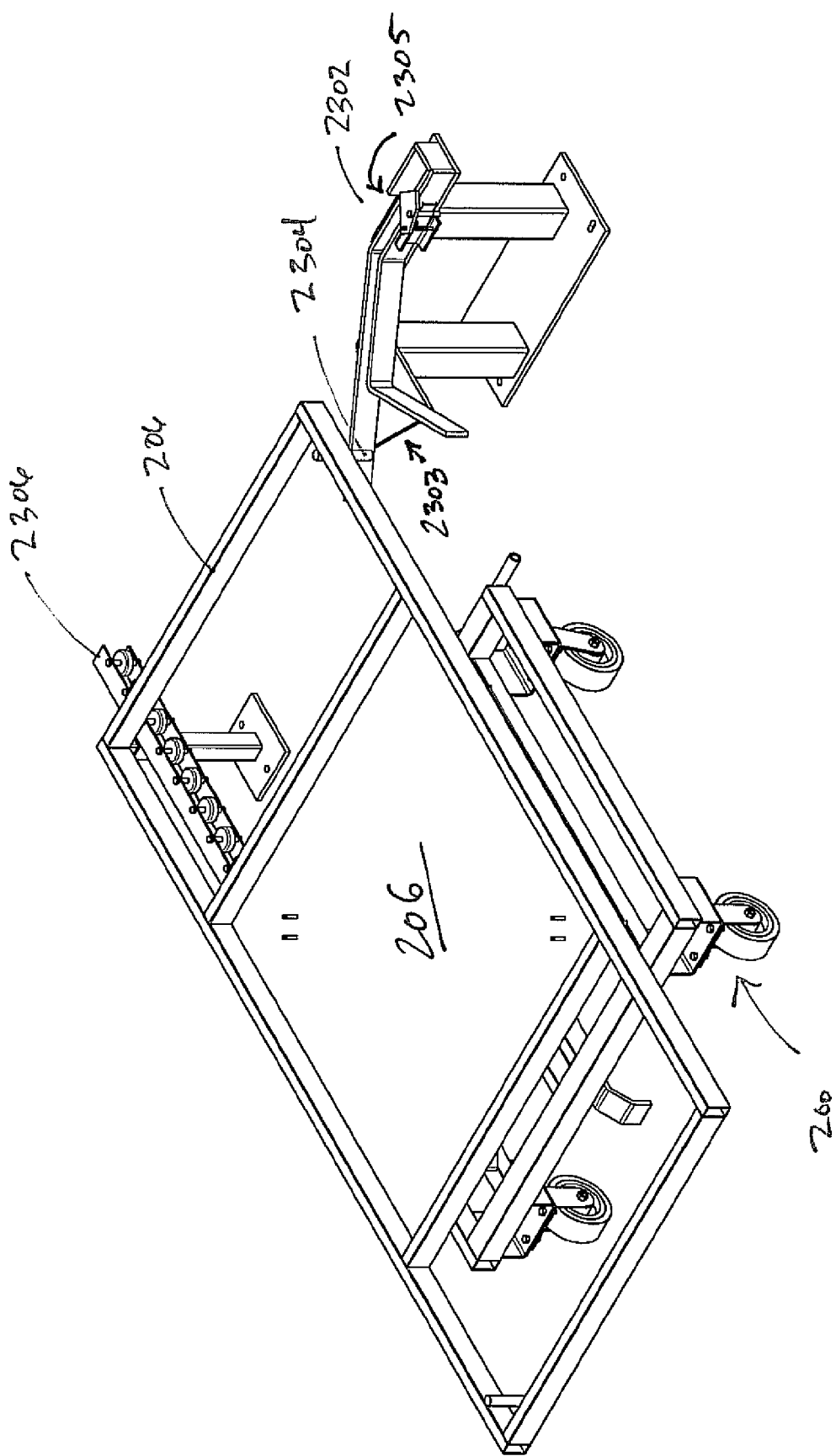
FIGS. 23-25 depict a cart and pin turning assembly.
Figure 24:
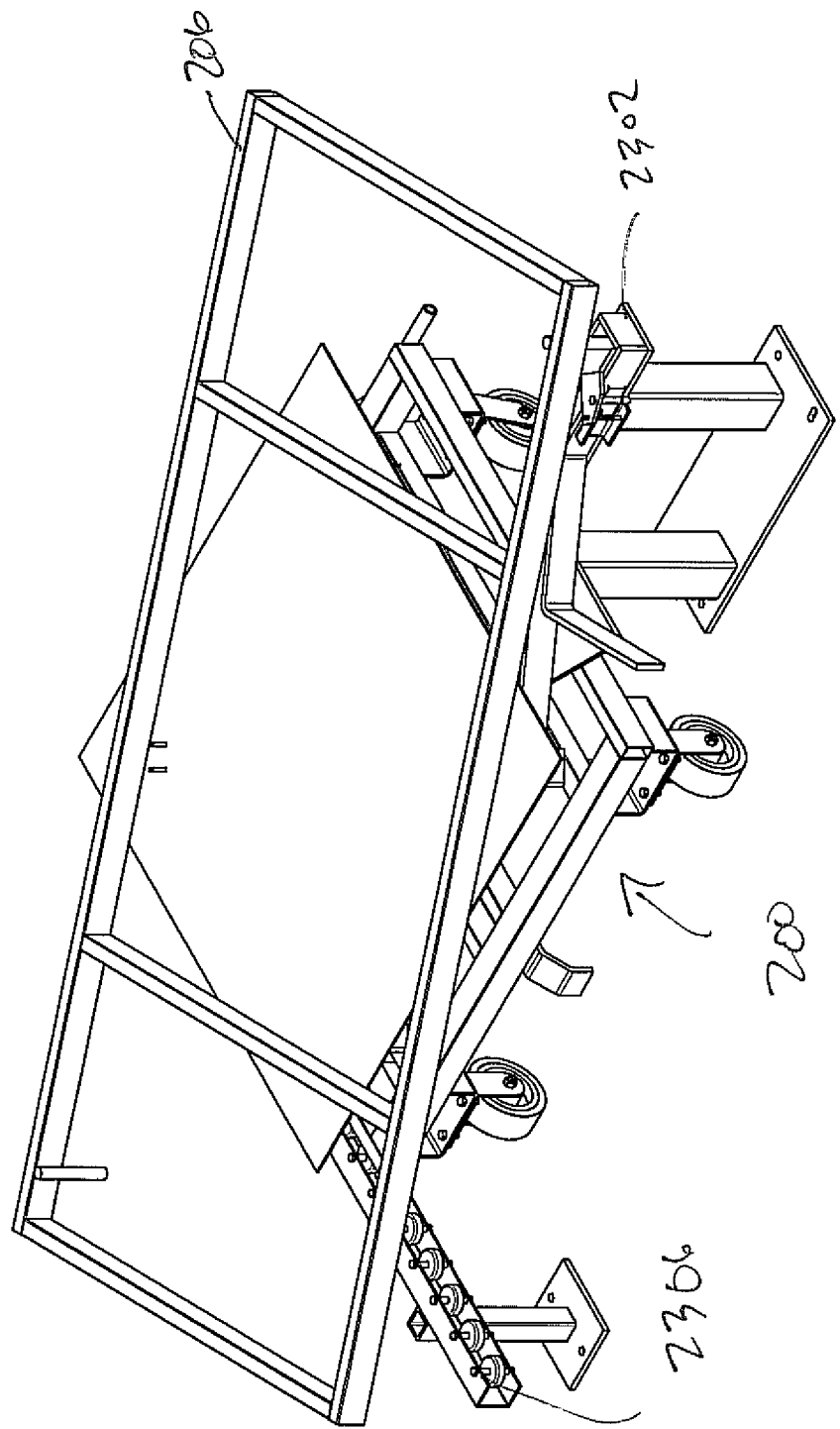
Figure 25:
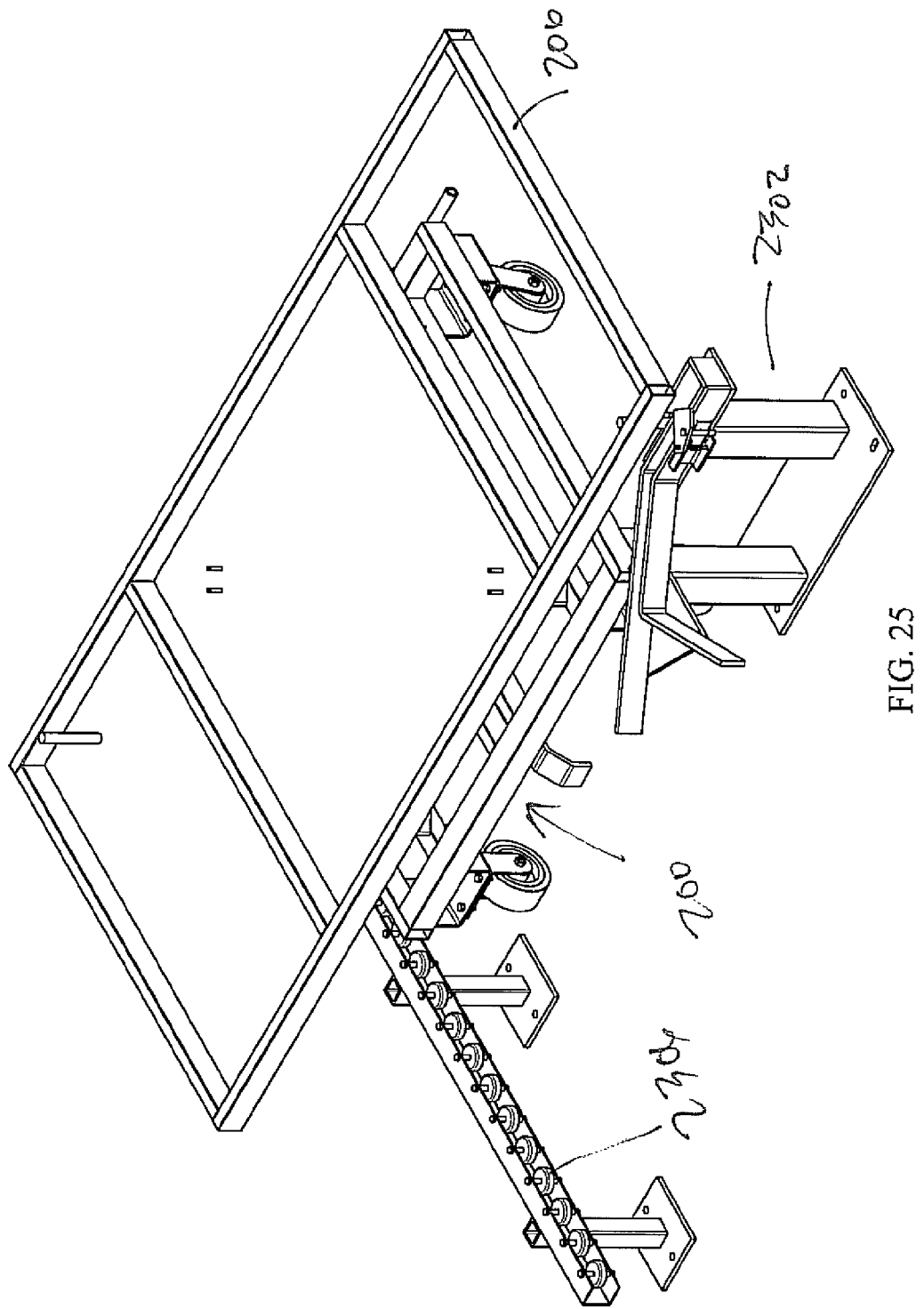

FIGS. 20, 21A-21B and 23-25 show pin turner assembly 2000 which is used to rotate the platform 206 of cart 200. The pin turner assembly 2000 allows the platform of a cart (such as cart 200) to rotate 90 degrees (or other desirable position) with respect to the base of the cart. Such rotation is useful to allow the manufacturing piece which sits on cart 200 to be turned for manufacturing purposes. The rotation is also useful to allow carts to be manipulated for stacking purposes such as for accumulation (as described elsewhere herein). By turning the platform 206 of cart 200, multiple carts may be more closely pushed together at stopping points along conveying system 100. As shown by the dashed lines in FIG. 20, platform 206 is in a first orientation prior to passing through pin turner assembly 2000. After passing through pin turner assembly 2000, platform 206 of cart 200 is rotated 90 degrees counter-clockwise. FIG. 23 shows the turning mechanism 2302 which facilitates turning of platform 206. When cart 200 passes along conveying system 100 through pen turner assembly 2000 and encounters turning mechanism 2302, turning mechanism 2302 receives turning pin 2304 attached to platform 206 of cart 200. As cart 200 continues to move, turning pin 2302 enters turning mechanism 2302 at entry 2303, which engages and redirects turning pin 2304 (and platform 206). As cart 200 progresses along the track, turning pin 2304 passes through turning mechanism 2302 in such a manner that it causes platform 206 to rotate 90 degrees. After rotation is completed, turning pin 2304 exits turning mechanism 2302 at exit 2305. As those skilled in the art recognize, other angular displacements are possible and may be desirable. A series of stabilizing wheels 2306 apply force against the base of cart 200 to prevent cart 200 from rotating while platform 206 rotates. In addition, the stabilizing wheels 2306 prevent cart 200 from over tipping or otherwise moving in undesirable ways.

Transfer Assembly

Figure 27:
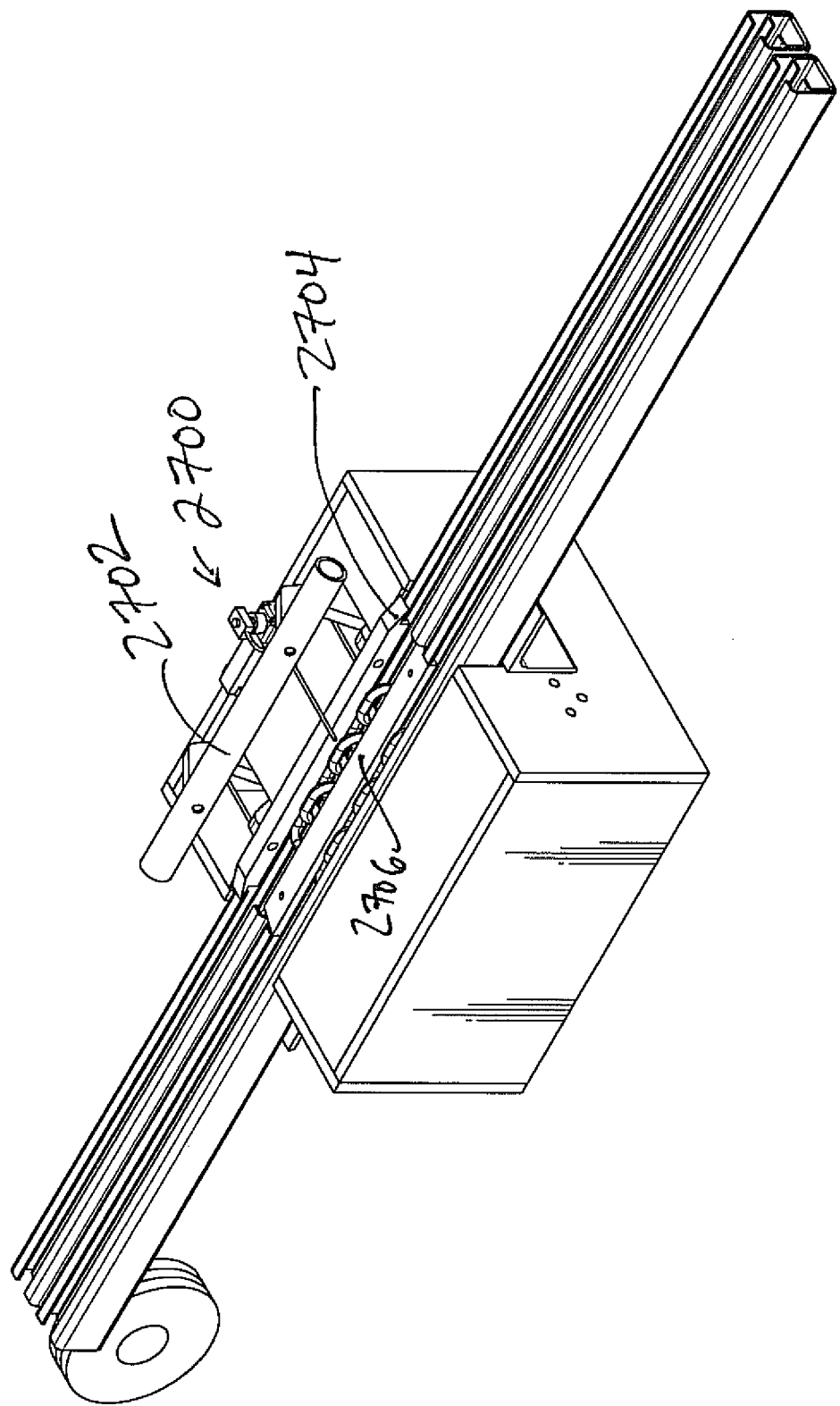
FIGS. 27 and 28 depict a cart transfer station.
Figure 28:
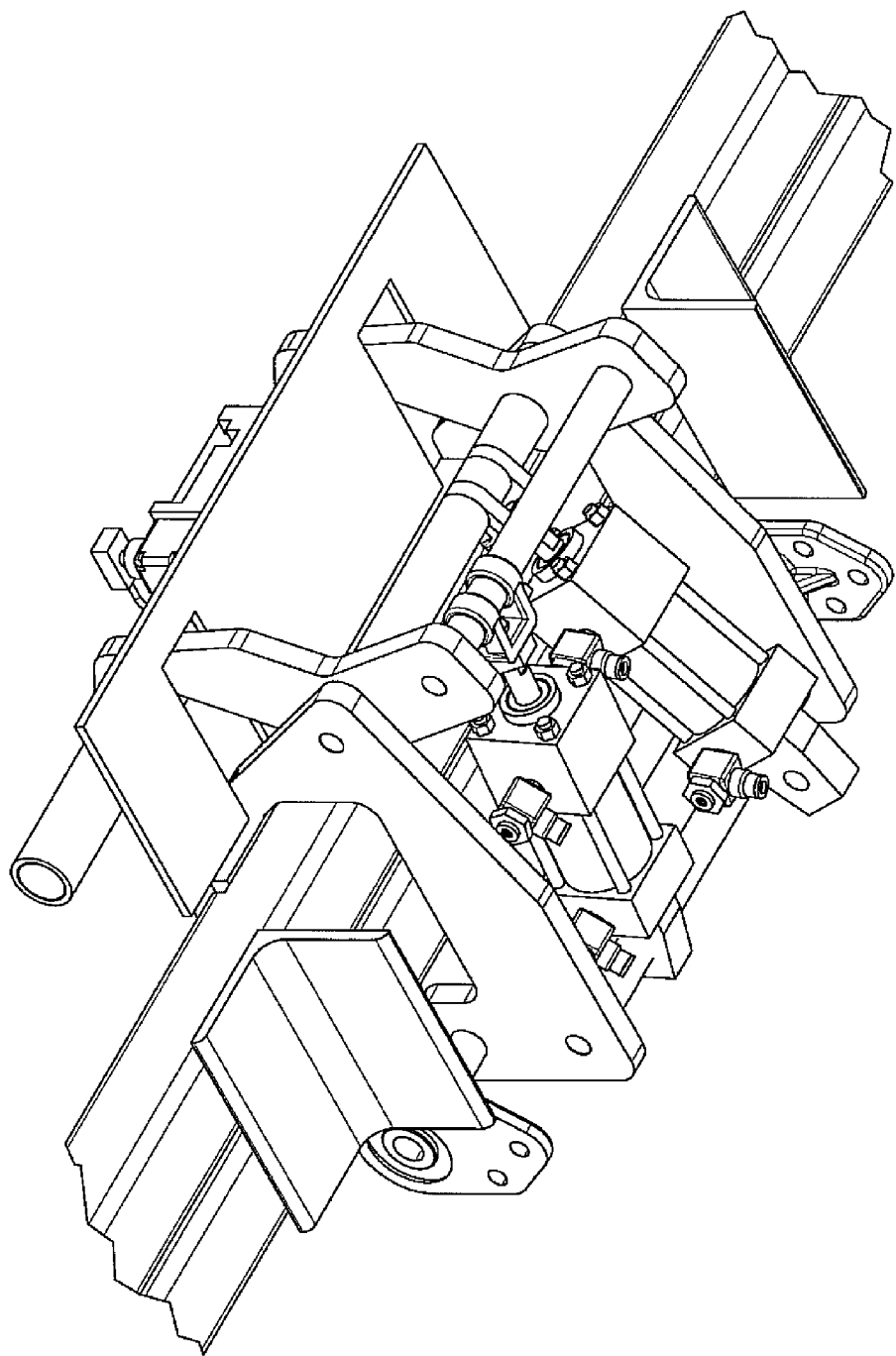

FIGS. 27 and 28 show a transfer assembly used to move a cart, such as cart 200, from a first conveying system, such as conveying system 100, to a second conveying system (not pictured) positioned adjacent to the first conveying system. As those skilled in the art recognize, it is often desirable in manufacturing facilities to have multiple manufacturing conveying systems, which each conveying system responsible for a discrete series of tasks. For example, a first conveying system may be configured with stations for assembling a piece of furniture, while a second conveying system may be configured with stations for painting and/or finishing that piece of furniture. In this example, a cart, such as cart 200, carrying that piece of furniture needs to transfer from the assembly conveying system to the painting/finishing conveying system. Without such a transfer, the furniture piece would need to physically be picked up off the cart in the assembly conveying system and moved to another cart in the painting/finishing system. To remedy this problem, transfer assembly 2700 is positioned along two parallel portions of track, one portion from the first conveying system and the second portion from the second conveying system.

When a cart approaches the transfer assembly 2700 on the first conveying system (the inside track in FIG. 27), the tow pin de-links from the tow chain when the release on the tow pin assembly is engaged by de-link ramp 2704. Once the tow pin is de-linked from the tow chain of the first conveying system, the transfer assembly engages and physically pushes the tow pin of the cart from the inside track (i.e., the track from the first conveying system) to the outside track (i.e., the track from the second conveying system). After passing through the transfer assembly 2700, the de-link ramp 2704 allows the release on the tow pin assembly to re-link the tow pin with the tow chain of the outside track of the second conveying system. In other embodiments, the transfer arm 2702 may physically push another portion of the cart, such as a wheel or the carts frame to facilitate the transfer.

As shown in FIG. 27, the transfer assembly 2700 utilizes an inclined surface 2706 between the first tow chain and the second tow chain of the first and second tracks respectively to facilitate transfer. The inclined surface 2706 prevents the tow pin from improperly veering off course from the first track to the second track until the transfer assembly engages and performs the transfer by pushing the cart with the transfer arm 2702 from the first track to the second track.

On-Surface Drive Assembly

In one exemplary embodiment, conveying system 100 utilizes an on-surface (or above ground) drive assembly 2900. The on-surface drive assembly 2900 allows conveying system 100 to be installed in manufacturing facility without the need to mount a traditional drive assembly below the surface of the manufacturing facility floor, upon which the track for conveying system 100 rests and carts (such as cart 200) travel. Mounting the on-surface drive assembly 2900 on the surface of the floor, as opposed to beneath the floor's surface reduces cost and instillation time while facilitating easier access for maintenance. FIGS. 29-31 show one exemplary embodiment of on-surface drive assembly 2900.

Figure 29:
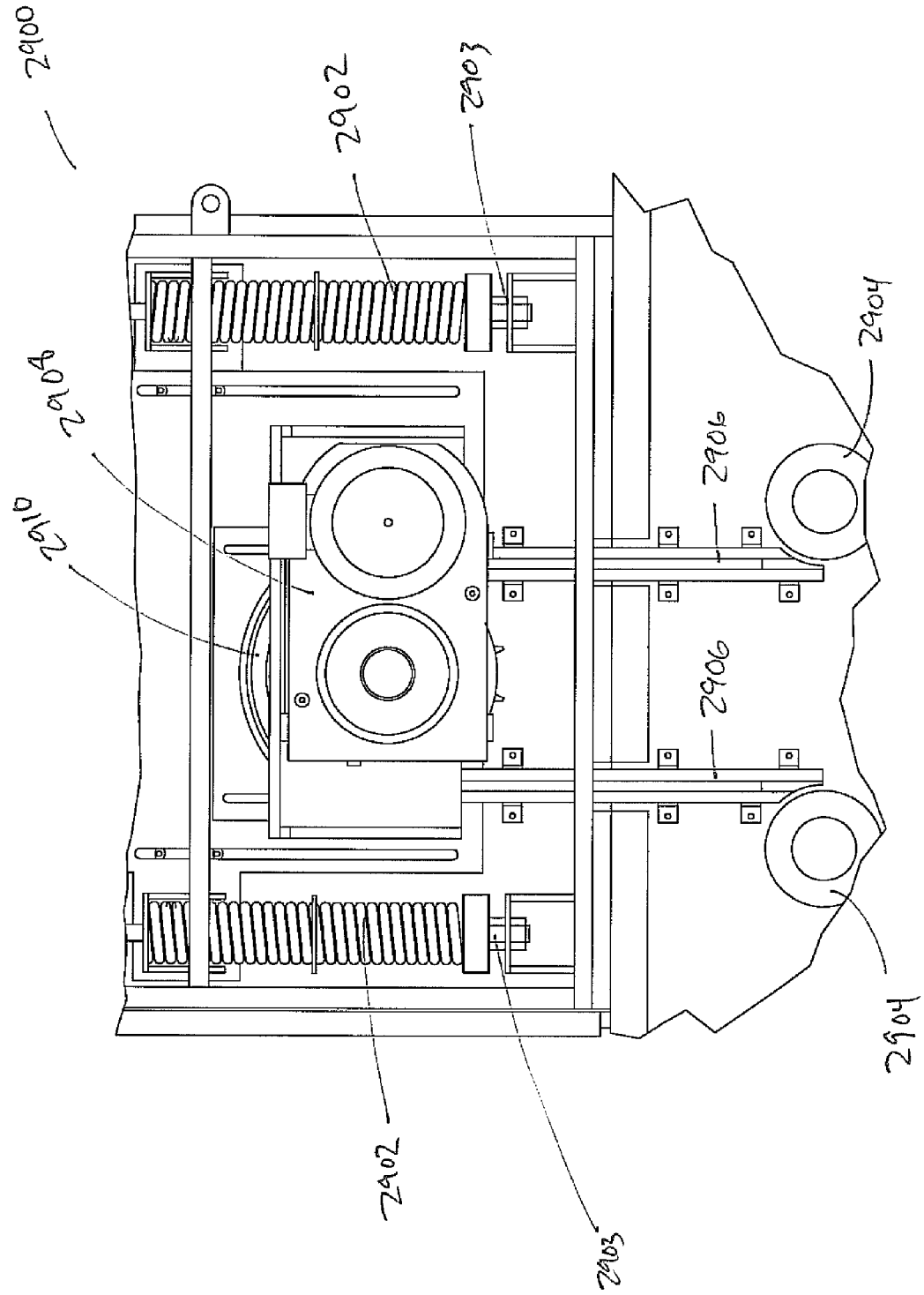
FIGS. 29-31 depict various views of an on-surface (or above ground) drive assembly.

FIG. 29 shows one embodiment of an on-surface drive assembly 2900 which may be mounted directly to the surface of a manufacturing facility floor. In this embodiment, two springs 2902 mounted on each side of on-surface drive assembly 2900 provide tensioning of the drive chain. In more traditional below surface drive assemblies, a recess for excess chain is necessary. In other words, excess chain may collect in a special recess. This excess chain is a result of chain wear and tear as chains lengthen over the course of time and the conveying system 100 must accommodate for such variances in tow chain length. In the exemplary on-surface drive assembly 2900 of the present invention, no such recess is necessary because springs 2900 allow on-surface drive assembly 2900 to move in relation to the fixed position of the track. As the tow chain loosens, the springs retract or expand, depending on their orientation, to keep the tow chain taught within an acceptable range or tolerance, which refers to a range to prevent undesirable slippage and tow pin disengagement. That is, on-surface drive assembly 2900 moves to accommodate the excess tow chain, thereby removing the need to collect excess chain. In another embodiment, not shown, on-surface drive assembly 2900 may utilize a single spring, or other configurations of multiple springs. In one embodiment, more clearly shown in FIG. 30, a guide rod 2903 passes through the center of spring 2902. Guide rod 2903 prevents spring 2902 from buckling or becoming misaligned by allowing the spring to move only along a singular linear axis. As springs 2902 compress and decompress, they move along the axis created by guide rod 2903.

Similarly, other embodiments may differ in the type of tensioning mechanism used. Instead of springs, hydraulic, air, or air over oil tensioning mechanisms may be used to provide tensioning to the on-surface drive assembly 2900. Should excess tow chain exceed the amount of take-up permitted, or put another way, exceeds an acceptable range or tolerance, by springs 2902 of on-surface drive assembly 2900, maintenance may be performed to shorten the tow chain. When this occurs, on-surface drive assembly 2900 would be re-tensioned to allow for the shortened tow chain. In this way, on-surface drive assembly 2900 allows for significant variances of tow-chain length and may be configured to take-up two feet or more in chain length before maintenance must be performed to shorten the tow chain.

Also shown in the on-surface drive assembly 2900 of FIG. 29 is drive motor 2908 which provides locomotion to the tow chain by turning a drive wheel 2910, such as that shown in FIG. 18B. The drive motor 2908 may be electrically powered and may be variable in frequency (e.g., frequency may vary from 1 foot of chain per minute to 30 feet of chain per minute). As an exemplary example, Euro Drive motor SEW MM15D-503-00 may be used. Other types of drive motors known in the art may be used.

Figure 30:
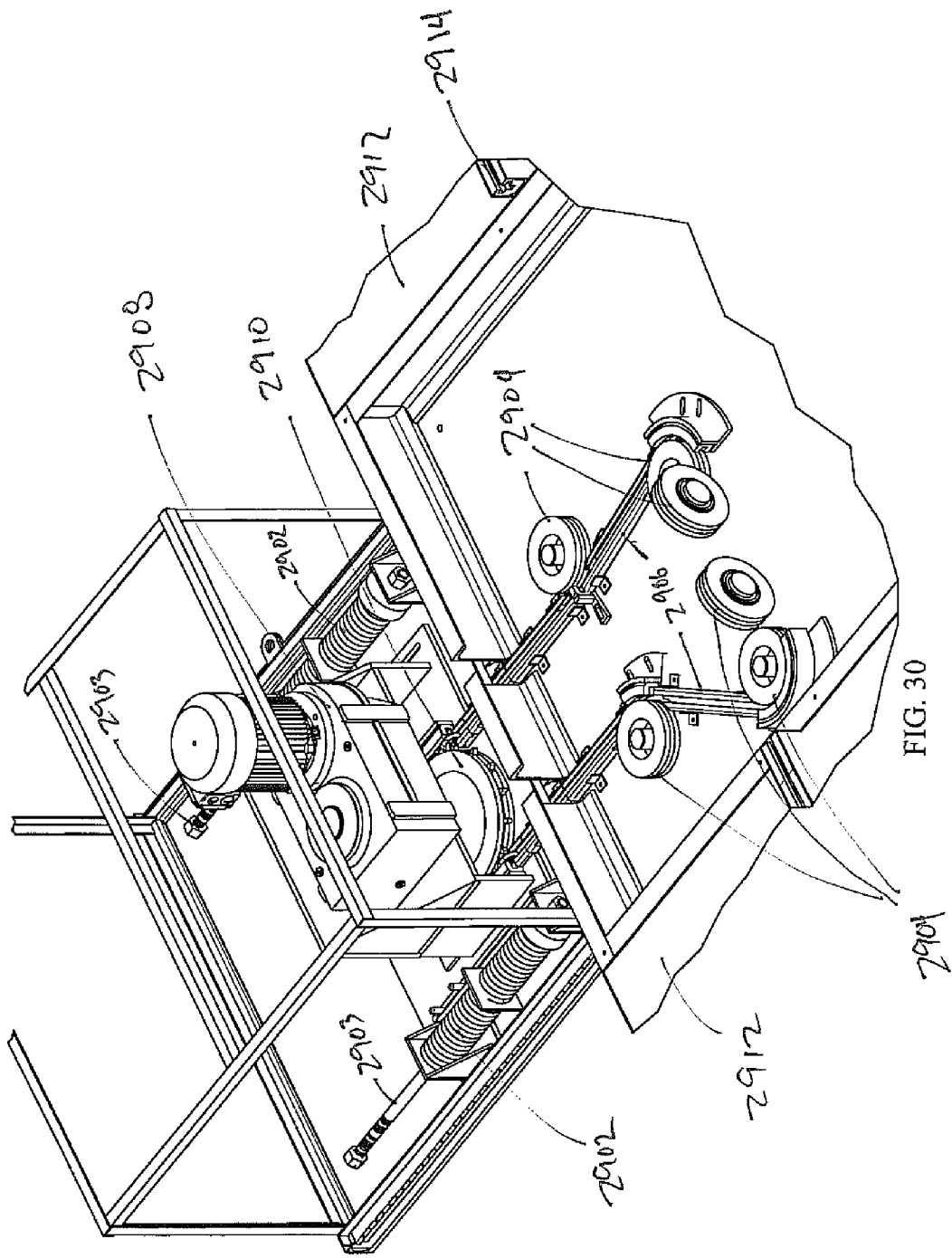
Figure 31:
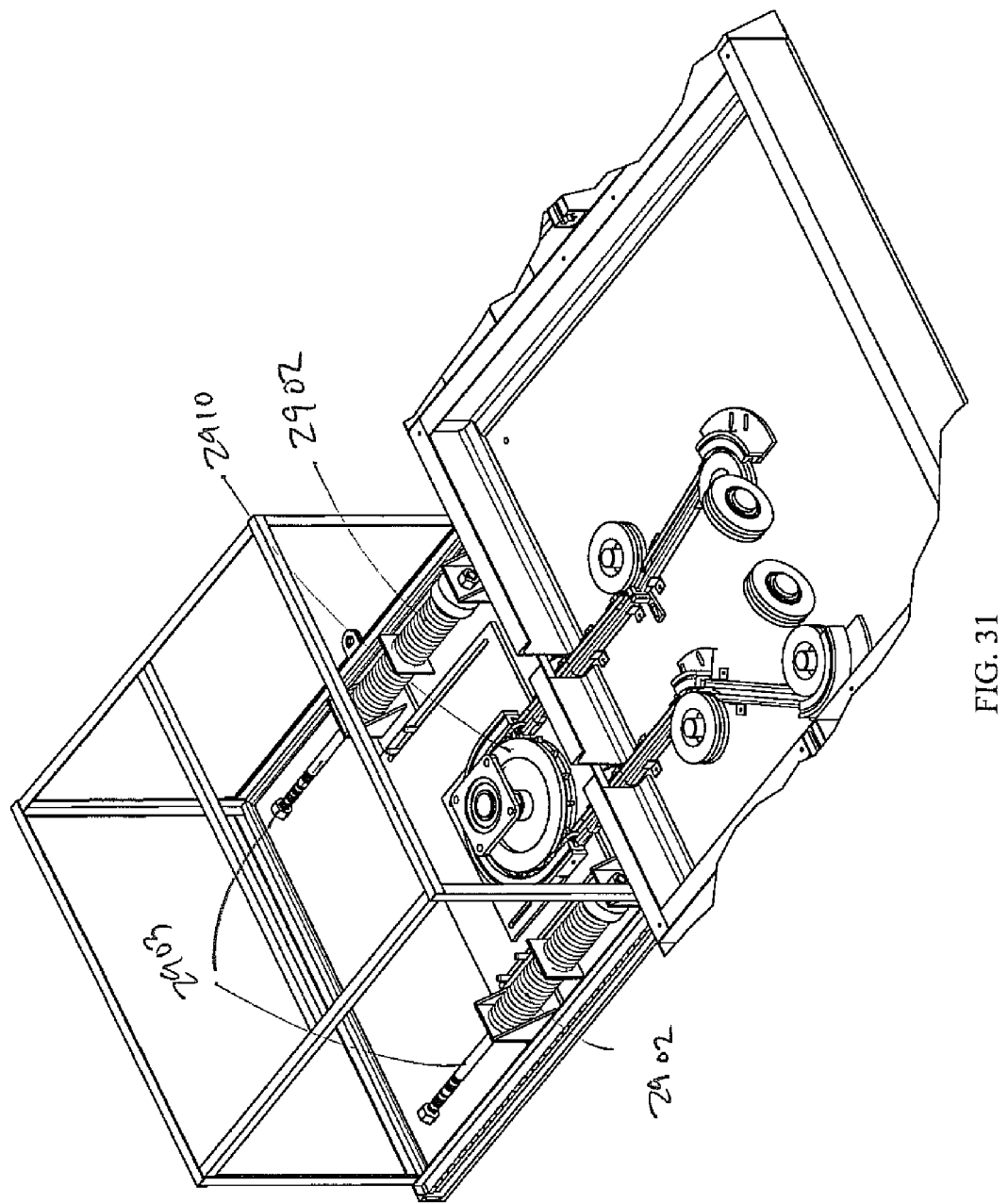

As shown in FIGS. 30 and 31, the on-surface drive assembly 2900 is positioned directly adjacent to a portion of track 2914. The tow chain (not pictured) passes through track 2914 and follows along a series of guide roller wheels 2904 into and out of on-surface drive assembly 2900. Additional pieces of track 2906 may be used between guide roller wheels 2904 to facilitate passage of tow chain. As those skilled in the art appreciate, various configurations of guide roller wheels 2904 and track 2906 are possible and may be dependent upon the specific requirements of individual conveying system configurations and installations.

FIG. 30 also shows portions of two ramps 2912. These ramps 2912 provide a slight incline upon which a cart, such as cart 200, may pass, thereby elevating the cart. In this way, the cart can pass over the routing of the tow chain into and out of on-surface drive assembly 2900.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

The invention claimed is:

1. A conveying system, comprising:
   at least one load carrying unit having a tow pin assembly, the tow pin assembly further comprising a tow pin configured to link to and de-link from a conveyor tow chain, and a means for engaging and disengaging the tow pin;
   a conveyor track configured to house the conveyor tow chain;
   a drive assembly configured to receive the tow chain and to provide locomotion to the conveyor tow chain, and further comprising at least one tensioner mechanism adapted to tension the conveyor tow chain; and
   a turning assembly comprising mechanical means for automatically rotating an upper portion of the at least one load carrying unit relative to a lower portion of the at least one load carrying unit.

2. The conveying system of claim 1, wherein the tensioner mechanism is selected from the group consisting of a spring, a hydraulic tensioning mechanism, an air tensioning mechanism, or an air over oil tensioning mechanism.

3. The conveying system of claim 1, further comprising:
   an accumulation assembly for accumulating a plurality of load carrying units, the accumulation assembly having a first stopping arm adapted to engage the tow pin assembly for causing a load carrying unit to stop at a defined location; and
   wherein the upper portion being in a rotated position 90 degrees relative to the lower portion, the length of the at least one load carrying unit being reduced with the upper portion in the rotated position, whereby a plurality of load carrying units may accumulate side-by-side along a relatively shorter distance compared to the plurality of load carrying units being in a non-rotated position.

4. The conveying system of claim 3, comprising a second stopping arm adapted to engage the tow pin assembly for causing a second load carrying unit to stop at a second defined location.

5. The conveying system of claim 1, wherein the tow pin further comprises a series of indentation rings about the circumferential surface, the indentation rings being configured to facilitate the application of a lubricant.

6. The conveying system of claim 1 wherein the turning assembly further comprises:
   a pin turning assembly configured to receive a turning pin on the portion of the at least one load carrying unit and further comprising a pin turning track for guiding the turning pin;
   a plurality of wheels configured to stabilize the lower portion of the at least one load carrying unit; and
   at least one tensioning wheel configured to provide a tensioning force against the lower portion of the at least one load carrying unit,
   wherein the at least one tensioning wheel is positioned on an opposite side of the lower portion of the at least one load carrying unit as the plurality of wheels.

7. The conveying system of claim 1, further comprising a transfer station.

8. The conveying system of claim 1, wherein the drive assembly further comprises:
   a drive motor configured to turn a drive gear, the drive gear being configured to receive a conveyor tow chain; and
   the tensioner mechanism further comprising a spring having a first end and a second end, the first end being connected to the drive motor and the second end being connected to a mount surface,
   wherein the spring applies a force between the drive motor and the mount surface to provide tension to the conveyor tow chain.

9. The conveying system of claim 8, wherein the tensioner mechanism further comprises a second spring having a first end and a second end, the first end being connected to the drive motor and the second end being connected to the mount surface.

10. A conveying system, comprising:
    at least one load carrying unit having a tow pin assembly, the tow pin assembly further comprising a tow pin configured to link to and de-link from a conveyor tow chain, and a means for engaging and disengaging the tow pin;
    a conveyor track configured to house the conveyor tow chain; and
    a drive assembly configured to receive the tow chain and to provide locomotion to the conveyor tow chain, and further comprising at least one tensioner mechanism adapted to tension the conveyor tow chain, the drive assembly further comprising:
       a drive motor configured to turn a drive gear, the drive gear being configured to receive a conveyor tow chain;
       the at least one tensioner mechanism comprising a spring having a first end and a second end, the first end being connected to the drive motor and the second end being connected to a mount surface,
       wherein the spring applies a force between the drive motor and the mount surface to provide tension to the conveyor tow chain; and
    a turning assembly comprising mechanical means for automatically rotating an upper portion of the at least one load carrying unit relative to a lower portion of the at least one load carrying unit.

11. The conveying system of claim 10, wherein the drive assembly further comprises a second spring having a first end and a second end, the first end being connected to the drive motor and the second end being connected to the mount surface.

12. The conveying system of claim 10, further comprising:
    an accumulation assembly for accumulating a plurality of load carrying units, the accumulation assembly having a first stopping arm adapted to engage the tow pin assembly for causing a load carrying unit to stop at a defined location; and
    wherein the upper portion being in a rotated position 90 degrees relative to the lower portion, the length of the at least one load carrying unit being reduced with the upper portion in the rotated position, whereby the plurality of load carrying units may accumulate side-by-side along a relatively shorter distance compared to the plurality of load carrying units being in a non-rotated position.

13. The conveying system of claim 12, comprising a second stopping arm adapted to engage the tow pin assembly for causing a second load carrying unit to stop at a second defined location.

14. The conveying system of claim 10, wherein the tow pin further comprises a series of indentation rings about the circumferential surface, the indentation rings being configured to facilitate the application of a lubricant.

15. The conveying system of claim 10, wherein the turning assembly further comprises:
    a pin turning assembly configured to receive a turning pin on the portion of the at least one load carrying unit and further comprising a pin turning track for guiding the turning pin;
    a plurality of wheels configured to stabilize a lower portion of the at least one load carrying unit; and
    at least one tensioning wheel configured to provide a tensioning force against the lower portion of the at least one load carrying unit,
    wherein the at least one tensioning wheel is positioned on an opposite side of the lower portion of the at least one load carrying unit as the plurality of wheels.

16. The conveying system of claim 10, further comprising a transfer station.

* * * * *